(12) United States Patent
Fujihara et al.

(10) Patent No.: US 11,938,991 B2
(45) Date of Patent: Mar. 26, 2024

(54) MOVING BODY

(71) Applicant: HONDA MOTOR CO., LTD., Tokyo (JP)

(72) Inventors: Naoki Fujihara, Saitama (JP); Daijiro Takizawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 296 days.

(21) Appl. No.: 17/429,242

(22) PCT Filed: Feb. 6, 2020

(86) PCT No.: PCT/JP2020/004658
§ 371 (c)(1),
(2) Date: Aug. 6, 2021

(87) PCT Pub. No.: WO2020/162563
PCT Pub. Date: Aug. 13, 2020

(65) Prior Publication Data
US 2022/0135102 A1     May 5, 2022

(30) Foreign Application Priority Data

Feb. 8, 2019   (JP) ................. 2019-021694
Feb. 8, 2019   (JP) ................. 2019-021695

(51) Int. Cl.
*B62B 5/02*       (2006.01)
*A61H 3/04*       (2006.01)
(Continued)

(52) U.S. Cl.
CPC ............. *B62B 5/026* (2013.01); *A61H 3/04* (2013.01); *B62B 3/008* (2013.01); *B62B 3/009* (2013.01);
(Continued)

(58) Field of Classification Search
CPC ...... A61H 3/04; A61H 3/06; A61H 2003/043; A61H 2003/046; B62B 5/02; B62B 5/026; A61G 5/061; A61G 5/065
See application file for complete search history.

(56) References Cited

U.S. PATENT DOCUMENTS 6,907,945 B2 *   6/2005   Kim .................. A61G 5/061
                                                 180/8.2
9,452,097 B2 *   9/2016   Lu ..................... A61G 5/065
(Continued)

FOREIGN PATENT DOCUMENTS

EP   537698 A1 *   4/1993 ............. A61G 5/061
JP   S60-004401 A    1/1985
(Continued)

OTHER PUBLICATIONS

Sang Bum Lee, Transportation System to Move Stairs, Sep. 7, 2011, EPO, KR 10-2011-0099202 A, Machine Translation of Description (Year: 2011).*

(Continued)

*Primary Examiner* — James A English
(74) *Attorney, Agent, or Firm* — Paratus Law Group, PLLC

(57) ABSTRACT

A moving body includes: a plurality of wheels capable of rotating around a plurality of rotating shafts disposed on a circumference around a common axis; and a supporting unit supporting the plurality of rotating shafts to be capable of revolving around the axis. A first power source is connected to the plurality of wheels to be capable of transmitting power so as to rotate the plurality of wheels. A second power source is connected to the supporting unit to be capable of transmitting power so as to revolve the plurality of wheels.

32 Claims, 18 Drawing Sheets

(51) Int. Cl.
  *B62B 3/00* (2006.01)
  *B62B 3/04* (2006.01)
  *B62B 3/12* (2006.01)
  *B62B 5/00* (2006.01)
  *B62B 5/04* (2006.01)
  *A61H 3/00* (2006.01)
  *B62B 5/06* (2006.01)

(52) U.S. Cl.
  CPC .................. *B62B 3/04* (2013.01); *B62B 3/12* (2013.01); *B62B 5/0036* (2013.01); *B62B 5/0053* (2013.01); *B62B 5/0066* (2013.01); *B62B 5/0073* (2013.01); *B62B 5/0404* (2013.01); *A61H 2003/001* (2013.01); *A61H 2003/043* (2013.01); *A61H 2003/046* (2013.01); *A61H 2201/0157* (2013.01); *A61H 2201/1215* (2013.01); *A61H 2201/1635* (2013.01); *B62B 5/0056* (2013.01); *B62B 5/06* (2013.01)

(56) References Cited

U.S. PATENT DOCUMENTS

| | | | |
|---|---|---|---|
| 10,315,284 B2* | 6/2019 | Sarsanedas Millet | H02K 7/145 |
| 10,513,284 B2* | 12/2019 | Gerhardt | B62J 45/41 |
| 10,806,649 B1* | 10/2020 | Cox | A61G 5/065 |
| 2009/0133517 A1 | 5/2009 | Kamara et al. | |
| 2009/0309319 A1 | 12/2009 | Kamara et al. | |
| 2010/0032911 A1 | 2/2010 | Sarokhan et al. | |
| 2013/0184917 A1 | 7/2013 | Sarokhan et al. | |
| 2013/0231814 A1 | 9/2013 | Sarokhan et al. | |
| 2013/0274973 A1 | 10/2013 | Kamara et al. | |
| 2015/0061240 A1 | 3/2015 | Segawa et al. | |
| 2018/0127013 A1 | 5/2018 | Gerhardt et al. | |
| 2019/0046390 A1* | 2/2019 | Takizawa | A61H 3/04 |

FOREIGN PATENT DOCUMENTS

| | | |
|---|---|---|
| JP | 2002-114151 A | 4/2002 |
| JP | 2010-534156 A | 11/2010 |
| JP | 2011-068167 A | 4/2011 |
| JP | 2015-016080 A | 1/2015 |
| JP | 2015-047986 A | 3/2015 |
| JP | 2015-147559 A | 8/2015 |
| KR | 10-2011-0099202 A | 9/2011 |

OTHER PUBLICATIONS

Toru Takenaka, Control Device of Inverted Pendulum Type Vehicle, Apr. 7, 2011, EPO, JP 2011-068167 A, Machine Translation of Description (Year: 2011).*

Mar. 31, 2020, International Search Report issued for related PCT Application No. PCT/JP2020/004658.

Mar. 31, 2020, International Search Opinion issued for related PCT Application No. PCT/JP2020/004658.

* cited by examiner

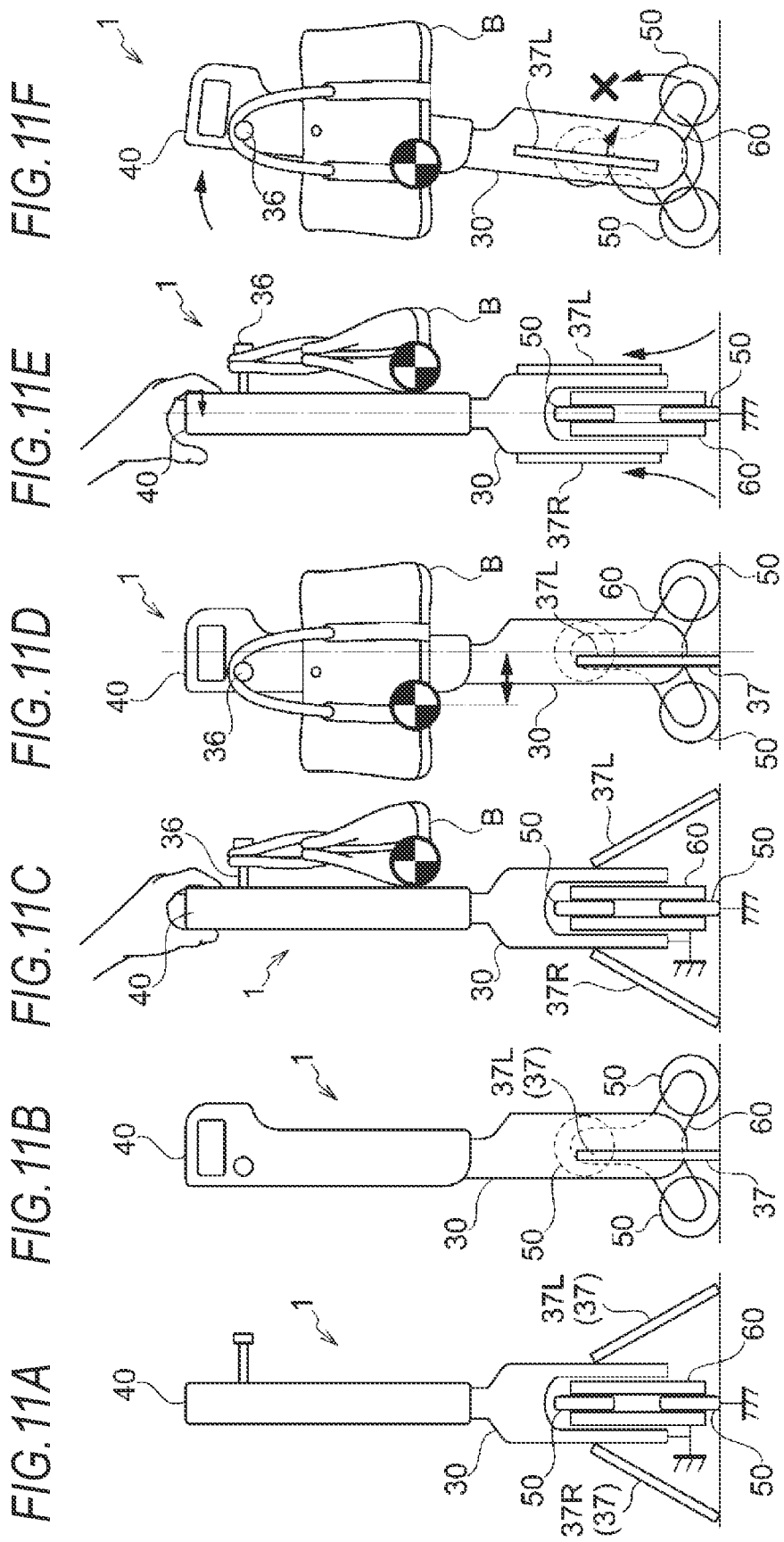

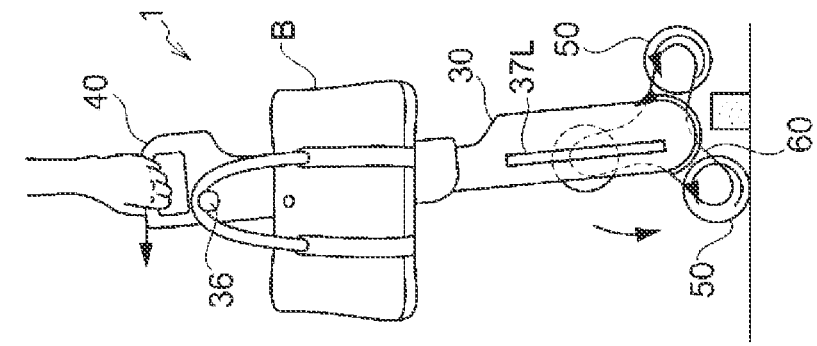
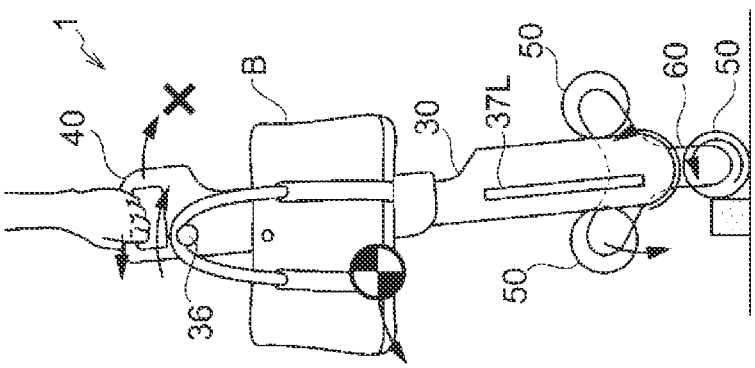
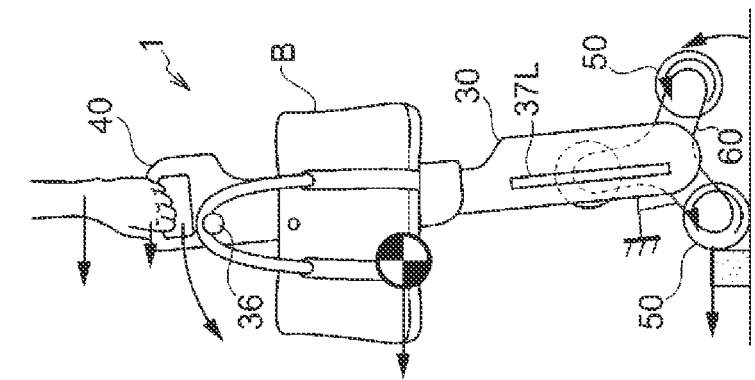
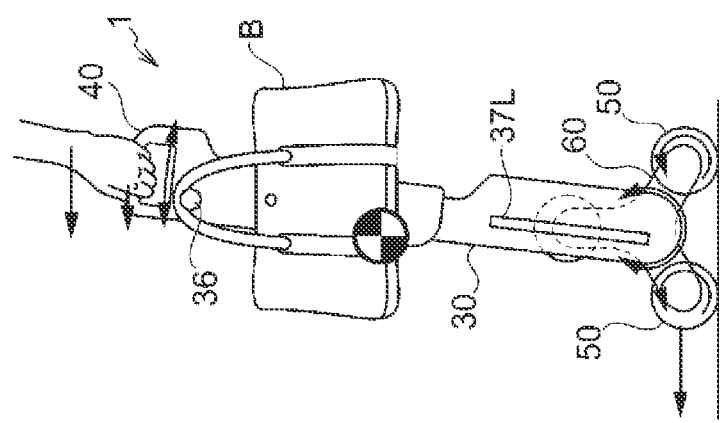

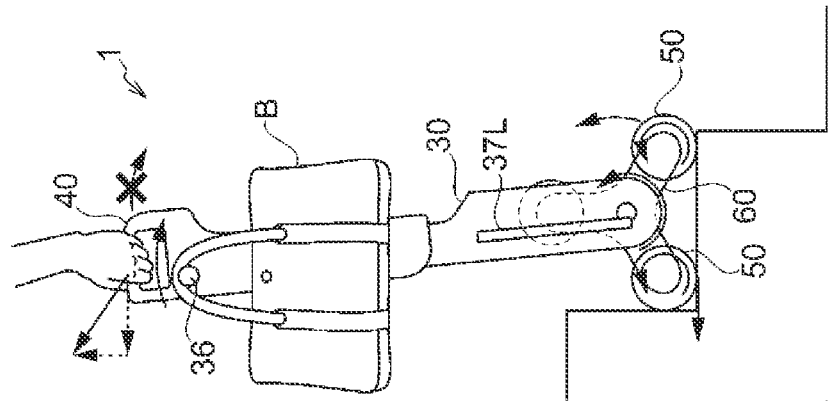
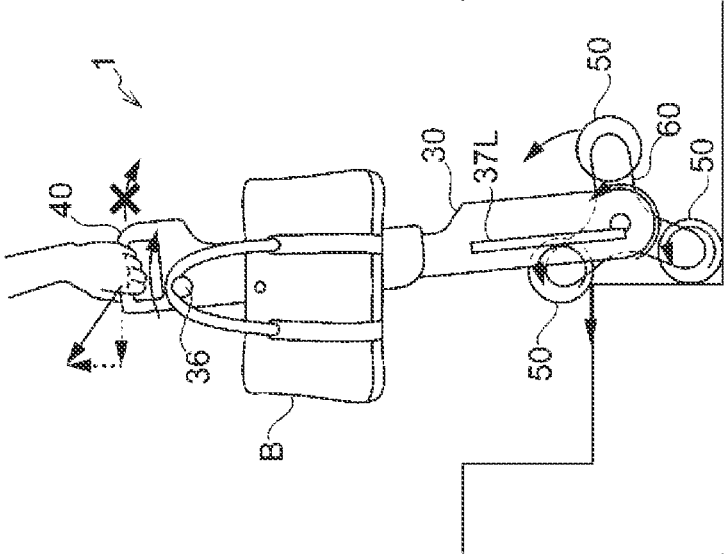
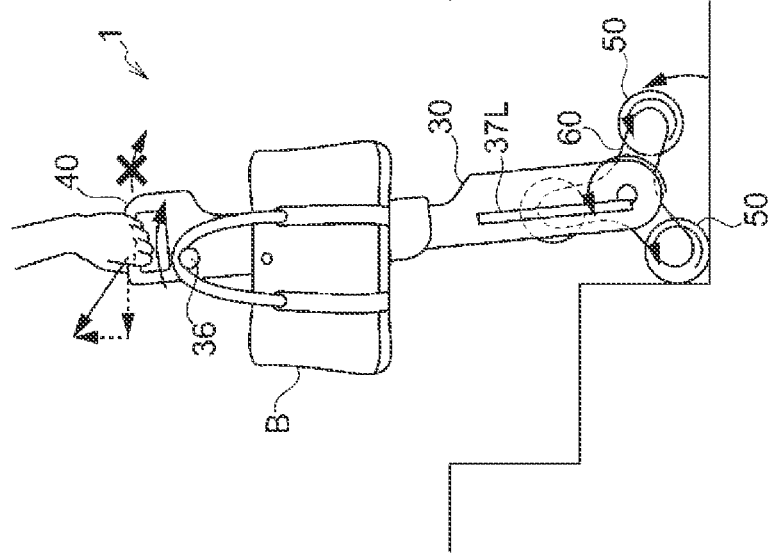

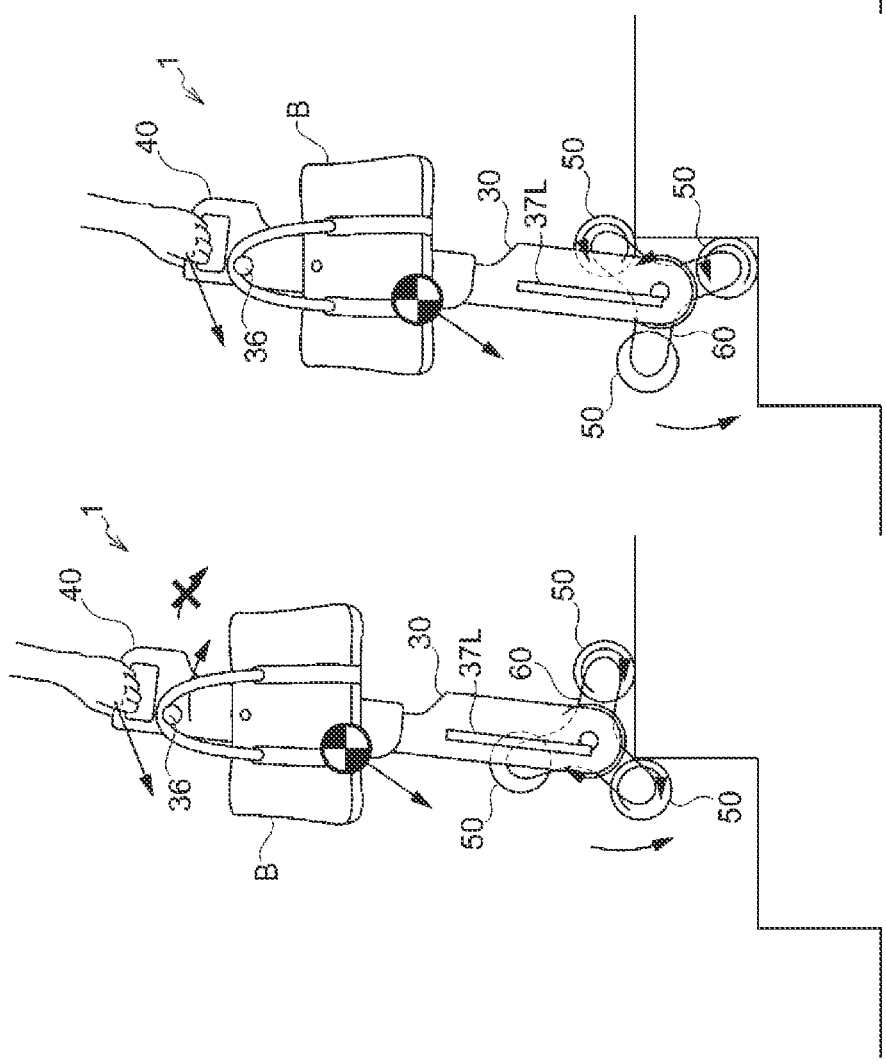

MOVING BODY

CROSS REFERENCE TO PRIOR APPLICATION

This application is a National Stage Patent Application of PCT International Patent Application No. PCT/JP2020/004658 (filed on Feb. 6, 2020) under 35 U.S.C. § 371, which claims priority to Japanese Patent Application Nos. 2019-021694 (filed on Feb. 8, 2019) and 2019-021695 (filed on Feb. 8, 2019), which are all hereby incorporated by reference in their entirety.

TECHNICAL FIELD

The present invention relates to a moving body equipped with a plurality of wheels.

BACKGROUND ART

For example, as a moving body equipped with a plurality of wheels, a wheel-type freely running gear described in Patent Literature 1 is known. In the wheel-type freely running gear, a driving shaft is positioned in a front portion in a traveling direction, and one or more sets of devices are disposed in which three external gears each having a wheel is engaged with a central gear on the driving shaft. When traveling on a flat ground, it travels with two wheels out of three around the driving shaft. When traveling is obstructed by approaching a non-flat ground such as stairs, the front wheels in the above-described two-wheel traveling is locked, and a small gear of the driving shaft reverses around a large gear of the locked wheels, thereby traveling on non-flat ground being possible.

CITATION LIST

Patent Literature

Patent Literature 1: JP-S60-4401A

SUMMARY OF INVENTION

Technical Problem

However, the wheel-type freely running gear described in Patent Literature 1 has room for improvement in terms of traveling performance since the front wheels do not revolve unless the front wheels in two-wheel traveling are locked.

The present invention provides a moving body in which a plurality of wheels can revolve even in a state where the wheels are not locked.

Solution to Problem

According to an aspect of the present invention, a moving body includes: a plurality of wheels capable of rotating around a plurality of rotating shafts disposed on a circumference around a common axis; and a supporting unit supporting the plurality of rotating shafts to be capable of revolving around the axis, in which a first power source is connected to the plurality of wheels to be capable of transmitting power so as to rotate the plurality of wheels, and a second power source is connected to the supporting unit to be capable of transmitting power so as to revolve the plurality of wheels.

According to another aspect of the present invention, a moving body includes: a plurality of wheels capable of rotating around a plurality of rotating shafts disposed on a circumference around a common axis; and a supporting unit supporting the plurality of rotating shafts to be capable of revolving around the axis, in which a second power source is connected to the supporting unit to be capable of transmitting power so as to revolve the plurality of wheels, and the moving body further includes a base holding the second power source, and a center-of-gravity moving mechanism configured to move a center-of-gravity position of the base.

According to still another aspect of the present invention, a moving body includes: a plurality of wheels capable of rotating around a plurality of rotating shafts disposed on a circumference around a common axis; and a supporting unit supporting the plurality of rotating shafts to be capable of revolving around the axis, in which a power source is connected to the plurality of wheels to be capable of transmitting power so as to rotate the plurality of wheels, and the moving body further includes a braking unit provided in at least one of the plurality of wheels, the power source, and a path of a power transmission mechanism connecting the power source and the plurality of wheels.

Advantageous Effects of Invention

According to the present invention, a plurality of wheels can revolve even in a state where the wheels are not locked.

BRIEF DESCRIPTION OF DRAWINGS

FIG. 2A is a front view of the walking support device, and FIG. 2B is a side view of the walking support device.

FIG. 5A is an explanatory view illustrating the irreversible rotation transmission body in a state where torque is input from an input shaft side, and FIG. 5B is an explanatory view illustrating the irreversible rotation transmission body in a state where torque is input from an output shaft side.

FIG. 6A is an explanatory view illustrating a behavior of the irreversible rotation transmission body in normal walking, FIG. 6B is an explanatory view illustrating a behavior of the irreversible rotation transmission body when the walking support device is climbing over a step or going up stairs, and FIG. 6C is an explanatory view illustrating the behavior of the irreversible rotation transmission body when the walking support device is stumbling.

FIGS. 11A to 11F are explanatory views illustrating the operation of the walking support device of FIG. 1. FIG. 11A is a front view illustrating the walking support device in an unattended state, FIG. 11B is a side view illustrating the walking support device in the unattended state, FIG. 11C is a front view illustrating a state where a hag is hung on the walking support device in the unattended state, FIG. 11D is a side view illustrating a state where a bag is hung on the walking support device in the unattended state, FIG. 11E is a front view illustrating the walking support device in a state where a power supply is on, and FIG. 11F is a side view illustrating the walking support device in the state where a power supply is on.

FIGS. 12A to 12D are explanatory views illustrating the operation of the walking support device of FIG. 1. FIG. 12A is a side view illustrating the walking support device at a start of walking, FIG. 12B is a side view illustrating the walking support device when stumbling over a step, FIG. 12C is a side view illustrating the walking support device at a start of climbing over a step, and FIG. 12D is a side view illustrating the walking support device while climbing over a step.

FIG. 13A is a side view illustrating the walking support device transitioning from a walking state to a stop state, and FIG. 13B is a side view illustrating the walking support device on a downhill.

FIGS. 14A to 14C are explanatory views illustrating the operation of the walking support device of FIG. 1. FIG. 14A is a side view illustrating the walking support device at a start of going up stairs, FIG. 14B is a side view illustrating the walking support device while going up stairs, and FIG. FIG. 14C is a side view illustrating the walking support device on completion of going up stairs.

FIGS. 15A to 15C are explanatory views illustrating the operation of the walking support device of FIG. 1. FIG. 15A is a side view illustrating the walking support device at a start of going down stairs, FIG. 15B is a side view illustrating the walking support device while going down stairs, and FIG. 15C is a side view illustrating the walking support device on completion of going down stairs.

DESCRIPTION OF EMBODIMENTS

Figure 1:
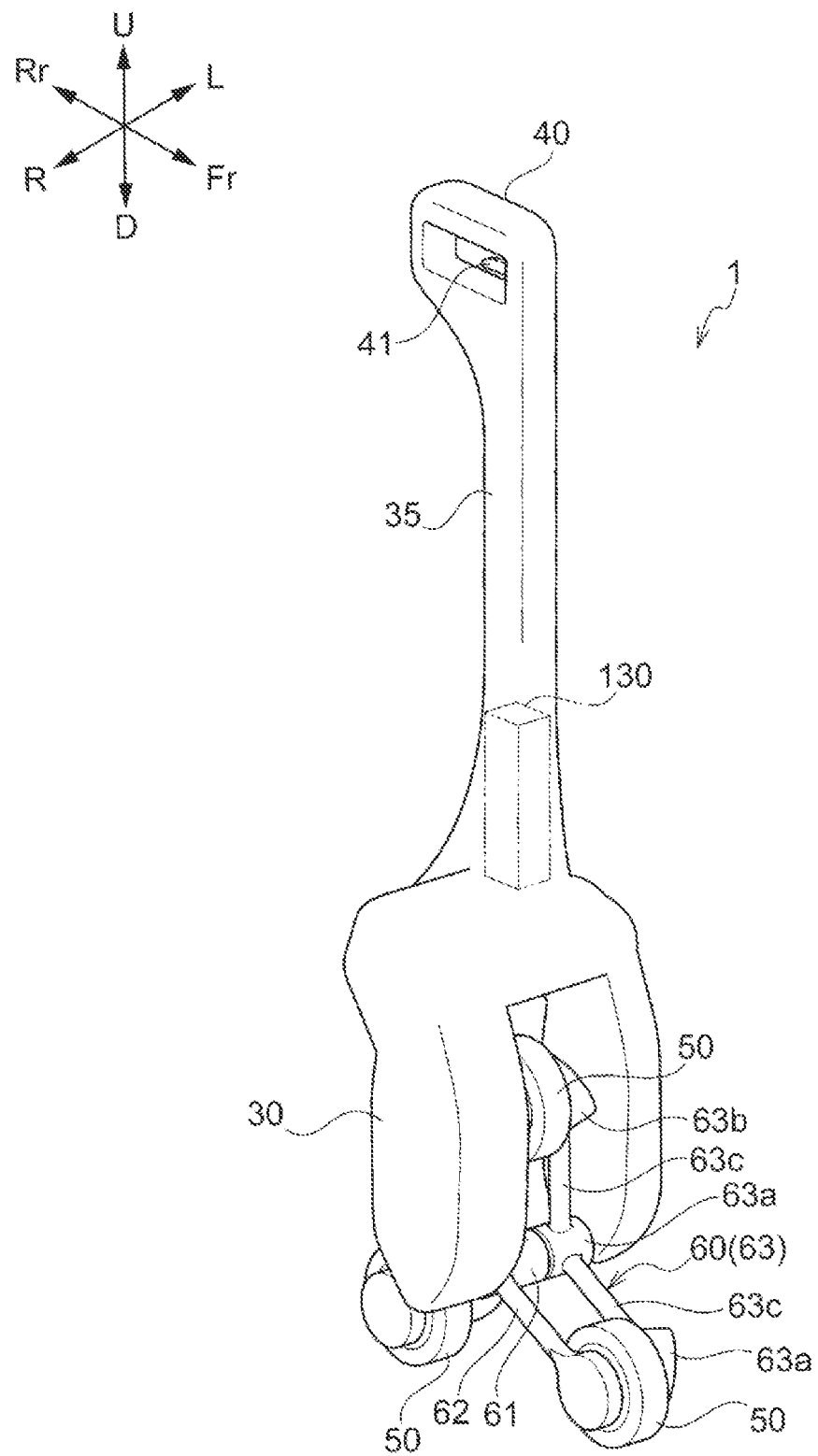
FIG. 1 is a perspective view illustrating a walking support device of a first embodiment as an embodiment of a moving body of the present invention.

Hereinafter, a walking support device will be described as an embodiment of a moving body of the present invention. The moving body of the present invention is not limited to the walking support device, which is a moving body for supporting walking, but can be used as a moving body for carrying luggage or a robot for any purpose. Hereinafter, each embodiment of the walking support device will be described with reference to the drawings. In the following description, a traveling direction of the walking support device is also referred to as a front-rear direction, and a width direction of the walking support device is also referred to as a left-right direction.

First Embodiment

[Walking Support Device]

As illustrated in FIGS. 1 to 4, a walking support device 1 according to an embodiment of the present invention includes: a first motor 10; a second motor 20; a main body case 30 accommodating the first motor 10 and the second motor 20; a plurality of drive wheels 50 capable of rotating around a plurality of rotating shafts 51 disposed on a circumference around a common axis C; a hub case 60 supported by the main body case 30 and supporting the plurality of rotating shafts 51 to be capable of revolving around the axis C; a rotating torque transmission mechanism 70 configured to transmit torque from the first motor 10 to the plurality of drive wheels 50; a braking mechanism 80 configured to apply a braking force to the plurality of drive wheels 50; a revolving torque transmission mechanism 90 configured to transmit torque from the second motor 20 to the hub case 60; a balancing torque transmission mechanism 100 configured to transmit torque from the second motor 20 to the main body case 30; an irreversible rotation transmission body 110 provided on a torque transmission path between the second motor 20 and the hub case 60 and between the second motor 20 and the main body case 30; a control unit 120 (refer to FIG. 7) configured to control the first motor 10, the second motor 20, and the braking mechanism 80 according to user's traveling intention or the like; and a battery 130 electrically connected to the first motor 10, the second motor 20, or the like. The axis C extends in the width direction (the left-right direction) of the walking support device 1.

(First Motor)

The first motor 10 includes: a stator 12 fixed to an inner circumferential portion of a motor cover 11; a rotor 13 rotatably disposed on the inner circumferential side of the stator 12; and a rotor shaft 14 coupled to an inner circumferential portion of the rotor 13 and rotatably supported by the motor cover 11. The motor cover 11 is fixed to the main body case 30, and torque output from the rotor shaft 14 is transmitted to the plurality of drive wheels 50 through the rotating torque transmission mechanism 70.

(Second Motor)

The second motor 20 includes: a stator 22 fixed to an inner circumferential portion of a motor cover 21; a rotor 23 rotatably disposed on the inner circumferential side of the stator 22; and a rotor shaft 24 coupled to an inner circumferential portion of the rotor 23 and rotatably supported by the motor cover 21. The second motor 20 is connected to the revolving torque transmission mechanism 90 and the balancing torque transmission mechanism 100 through the irreversible rotation transmission body 110, and torque output from the rotor shaft 24 or the motor cover 21 is transmitted to the hub case 60 or the main body case 30.

(Main Body Case)

The main body case 30 includes: a gripping unit 40 provided at an upper portion of the main body case 30 for a user to grip the main body case 30; a motor accommodation unit 31 accommodating the first motor 10 and the second motor 20; a revolving torque transmission mechanism accommodation unit 32 connected to the right side of the motor accommodation unit 31 and accommodating the revolving torque transmission mechanism 90; a rotating torque transmission mechanism accommodation unit 33 connected to the left side of the motor accommodation unit 31 and accommodating the rotating torque transmission mechanism 70 and the braking mechanism 80; a balancing torque transmission mechanism accommodation unit 34 connected to the outer side of the rotating torque transmission mechanism accommodation unit 33 and accommodating the balancing torque transmission mechanism 100; and a tubular unit 35 connecting the gripping unit 40 and an upper portion of the motor accommodation unit 31 and accommodating the battery 130.

The main body case 30 has a space S for disposing the hub case 60 and the plurality of drive wheels 50 below the motor accommodation unit 31, between the revolving torque transmission mechanism accommodation unit 32 and the rotating torque transmission mechanism accommodation unit 33, and between the revolving torque transmission mechanism accommodation unit 32 and balancing torque transmission mechanism accommodation unit 34 in the left-right direction. A revolving shaft 61 of the hub case 60 is rotatably supported between the inner surface of a lower end portion of the revolving torque transmission mechanism accommodation unit 32 and the inner surface of a lower end portion of the rotating torque transmission mechanism accommodation unit 33.

The main body case 30 is provided with a hook unit 36 for hanging luggage B such as a handbag. The hook unit 36 of the present embodiment is configured to protrude from an upper end portion (in the vicinity of a lower part of the gripping unit 40) of the tubular unit 35 to either the left or right side in a hanging state and to be retracted in the upper end portion of the tubular unit 35 in a retracted state. In an upright posture where the main body case 30 stands up along the vertical direction, the hook unit 36 is positioned in front of a virtual vertical line P passing through the axis C.

A stand 37 (see FIG. 11) for making the walking support device 1 stand on its own in an unattended is provided on the outer surface of the left and right sides of a lower end portion of the main body case 30. The stand 37 is configured to be displaceable to at least an upper position (first position) and a lower position (second position) and, in the lower position, to abut against a surface with which the drive wheels 50 are in contact so as to support a load of the walking support device 1. More specifically, the stand 37 includes: a left stand 37L provided on the left side of the plurality of drive wheels 50 so that a lower end side protrudes to the left in the lower position; and a right stand 37R provided on the right side of the plurality of drive wheels 50 so that a lower end side protrudes to the right side in the lower position. In the upper position, a closed state where the stand 37 is retracted along the outer surface of the left and right sides of a lower end portion of the main body case 30 is created. Meanwhile, in the lower position, the stand 37 extends diagonally downward from the outer surface of the left and right sides of the lower end portion of the main body case 30 so that tip end portions are grounded, thereby reaching an open state where the walking support device 1 is prevented from tipping in the left-right direction.

(Intention Acquisition Means)

The walking support device 1 is provided with intention acquisition means 43 configured to acquire user's using intention and user's traveling intention. The intention acquisition means 43 is a power switch, an operation lever, a pressure sensor, a touch panel, an accelerator handle, an operation button, a voice recognition device, or the like or combination thereof. In the present embodiment, a power switch (not illustrated) and an operation lever 41 are provided to acquire user's using and non-using (to leave unattended) intention, and a pressure sensor (not illustrated) is provided in the gripping unit 40 to acquire user's traveling and stopping intention.

(Traveling State Acquisition Means)

The walking support device 1 is provided with traveling state acquisition means 44 configured to acquire a traveling state of the walking support device 1. The traveling state acquisition means 44 is a sensor device such as a speed sensor and a three-axis acceleration sensor.

(Slope Detection Means and Step Detection Means)

It is preferable that the walking support device 1 is provided with slope detection means 45 configured to detect a slope of a surface on which the walking support device 1 travels and step detection means 46 configured to acquire a step of a surface on which the walking support device 1 travels, respectively. The slope detection means 45 and the step detection means 46 are sensor devices such as three-axis acceleration sensor, combination of camera and radar, and the like.

(Stand Position Acquisition Means)

The walking support device 1 is provided with stand position acquisition means 47 configured to acquire the position of the stand 37. The stand position acquisition means 47 is a sensor device such as a position sensor and is configured to determine whether the stand 37 is in the upper position or in the lower position.

(Drive Wheels)

Figure 4:
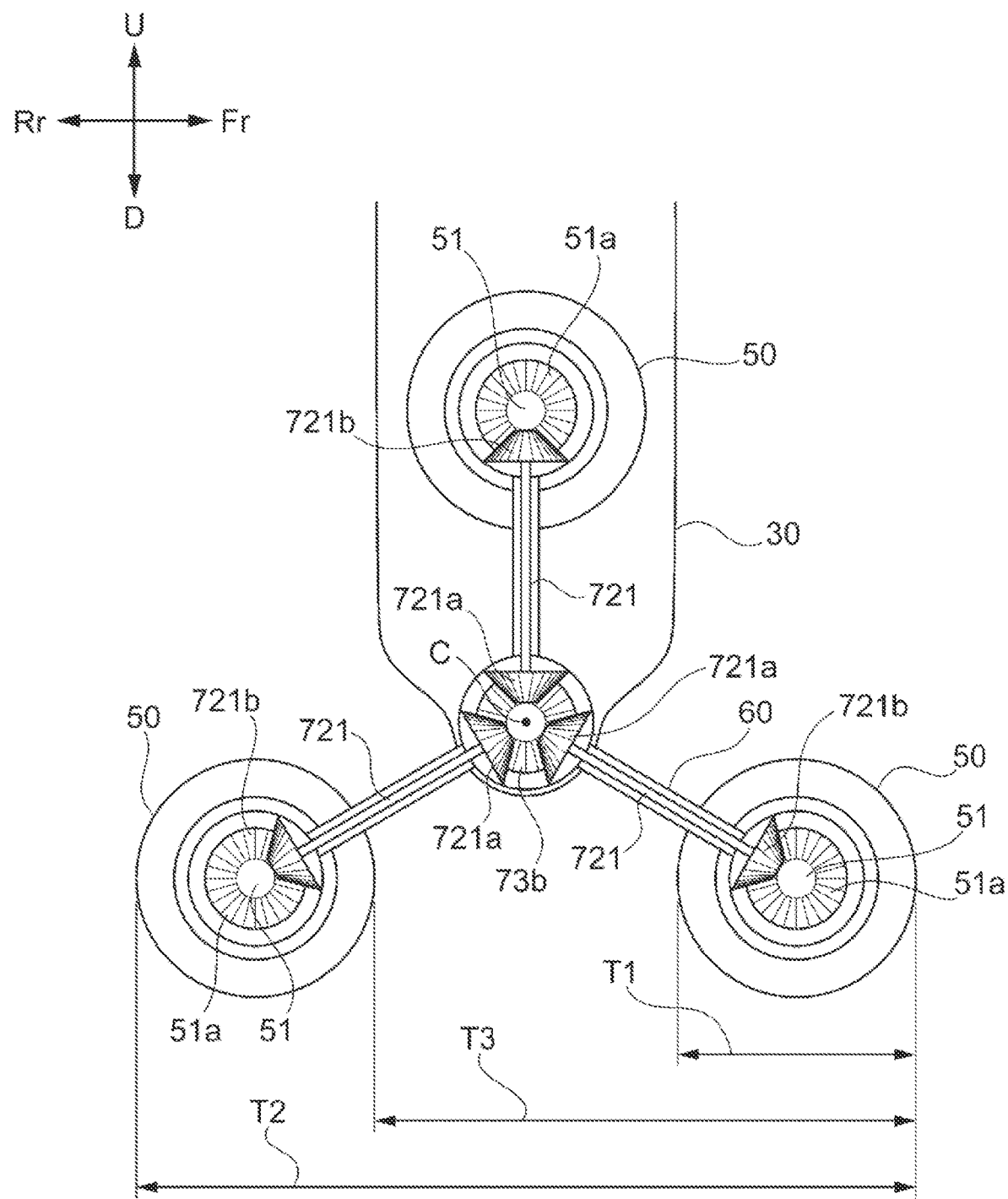
FIG. 4 is a schematic side view illustrating an inside of drive wheels and a hub case of the walking support device of FIG. 1.

The walking support device 1 of the present embodiment includes three drive wheels 50 disposed on the common circumference. The three drive wheels 50 are capable of rotating around three rotating shafts 51 disposed on the circumference around the common axis C, and, in a normal traveling state where the walking support device 1 is neither climbing over a step nor going up or down stairs, two grounded drive wheels 50 out of three drive wheels 50 rotate to move the walking support device 1 in the traveling direction. As illustrated in FIG. 4, the drive wheels 50 of the present embodiment have a diameter T1 so that the walking support device 1 can climb over a small step only by their rotation, a distance T2 between a front end and a rear end of the two grounded drive wheels 50 in the traveling direction is set so that the walking support device 1 can enter an elevator, and a distance T3 between a rear end and a front end of the adjacent drive wheels 50 is set so that the walking support device 1 can going up and down stairs by their revolving. These dimensions or the number of drive wheels 50, however, can be changed according to a purpose or environment of the walking support device 1.

(Hub Case)

The hub case 60 includes: a hollow cylindrical revolving shaft 61 extending in the shaft direction (the left-right direction) from the axis C as a rotation center; three first drive wheel support cases 62 extending in the outer diameter direction from the left side of the revolving shaft 61; and three second drive wheel support cases 63 extending in the outer diameter direction from the right side of the revolving shaft 61 so as to be in the same phase with the first drive wheel support cases 62 in the rotational direction and rotatably supports the rotating shafts 51 of the drive wheels 50 between tip end portions of the first drive wheel support cases 62 and the second drive wheel support cases 63. The revolving shaft 61 and the second drive wheel support cases 63 are also used as transmission cases accommodating a part of the rotating torque transmission mechanism 70. The revolving shaft 61 and the second drive wheel support cases 63 may accommodate the rotating torque transmission mechanism 70 in a state where a part of the rotating torque transmission mechanism 70 is exposed.

(Rotating Torque Transmission Mechanism)

The rotating torque transmission mechanism 70 includes: an upstream rotating torque transmission mechanism 71 accommodated in the rotating torque transmission mechanism accommodation unit 33 of the main body case 30; a downstream rotating torque transmission mechanism 72 accommodated in the second drive wheel support cases 63 of the hub case 60; and a through shaft 73 passing through the inside of the revolving shaft 61 of the hub case 60 and connecting the upstream rotating torque transmission mechanism 71 and the downstream rotating torque transmission mechanism 72 to be capable of transmitting torque.

The upstream rotating torque transmission mechanism 71 includes: a first transmission shaft 711 connected to the rotor shaft 14 of the first motor 10; and a second transmission shaft 712 rotatably supported on a lower end side of the rotating torque transmission mechanism accommodation unit 33, the first transmission shaft 711 is provided with a small-diameter pulley 711a, and the second transmission shaft 712 is provided with a large-diameter pulley 712a and a small-diameter gear 712b. When torque is output from the rotor shaft 14 of the first motor 10 to the first transmission shaft 711, the torque is transmitted from the small-diameter pulley 711a of the first transmission shaft 711 to the large-diameter pulley 712a of the second transmission shaft 712 through a transmission belt 713 and is transmitted from the small-diameter gear 712b of the second transmission shaft 712 to a small-diameter gear 73a provided at one end portion of the through shaft 73.

The downstream rotating torque transmission mechanism 72 has three transmission shafts 721 extending along the outer diameter direction from the other end portion of the through shaft 73, and both end portions of each of the transmission shafts 721 are provided with bevel gears 721a and 721b. Torque transmitted from the first motor 10 to one end portion of the through shaft 73 through the upstream rotating torque transmission mechanism 71 is transmitted from a bevel gear 73b provided at the other end portion of the through shaft 73 to the bevel gears 721a of the transmission shafts 721 and is transmitted from the bevel gears 721b to bevel gears 51a provided in the rotating shafts 51 of the drive wheels 50. The bevel gear 73b and the bevel gears 721a are accommodated in a case center portion 63a of the second drive wheel support cases 63, the bevel gears 51a and the bevel gears 721b are accommodated in a case planetary portions 63b of the second drive wheel support cases 63 equally spaced in the circumferential direction around the case center portion 63a and separated from the case center portion 63a, and transmission shafts 721 are accommodated in case neck portions 63c of the second drive wheel support cases 63 connecting the case center portion 63a and the case planetary portions 63b.

(Braking Mechanism)

The braking mechanism 80 includes: a disk unit 81 provided in the first transmission shaft 711 of the upstream rotating torque transmission mechanism 71; and a braking unit 82 configured to generate a braking force on the drive wheels 50 by sandwiching an outer circumference of the disk unit 81 from both the left and right sides. The braking unit 82 has an electrically operated actuator, and the control unit 120 is configured to operate the braking mechanism 80 based on drive control of the actuator. The braking mechanism 80 may be a manual braking mechanism manually mechanically operated without intervention by the control unit 120. As long as it is possible to generate a braking force on the drive wheels 50, the braking mechanism 80 is not limited to be provided on the rotating torque transmission mechanism 70, which connects the first motor 10 and the drive wheels 50, but may be provided on three drive wheels 50 or on the first motor 10.

(Revolving Torque Transmission Mechanism)

The revolving torque transmission mechanism 90 has four transmission shafts 91 to 94 rotatably supported in the revolving torque transmission mechanism accommodation unit 32 of the main body case 30, and the first transmission shaft 91 is connected to the rotor shaft 24 of the second motor 20. The first transmission shaft 91 is provided with a small-diameter pulley 91a, the second transmission shaft 92 is provided with a large-diameter pulley 92a and a small-diameter pulley 92b, the third transmission shaft 93 is provided with a large-diameter pulley 93a and a small-diameter gear 93b, and the fourth transmission shaft 94 is provided with a large-diameter gear 94a and a small-diameter gear 94b. When torque is output from the rotor shaft 24 of the second motor 20 to the first transmission shaft 91, the torque is transmitted from the small-diameter pulley 91a of the first transmission shaft 91 to the large-diameter pulley 92a of the second transmission shaft 92 through a first transmission belt 95, is transmitted from the small-diameter pulley 92b of the second transmission shaft 92 to the large-diameter pulley 93a of the third transmission shaft 93 through a second transmission belt 96, and is transmitted from the small-diameter gear 93b of the third transmission shaft 93 to the large-diameter gear 94a of the fourth transmission shaft 94. Furthermore, the torque is transmitted from the small-diameter gear 94b of the fourth transmission shaft 94 to the small-diameter gear 61a, which is provided at one end portion of the revolving shaft 61 of the hub case 60.

(Balancing Torque Transmission Mechanism)

The balancing torque transmission mechanism 100 has four transmission shafts 101 to 104 rotatably supported in the balancing torque transmission mechanism accommodation unit 34 of the main body case 30, and the first transmission shaft 101 is connected to the motor cover 21 of the second motor 20 through the irreversible rotation transmission body 110. The first transmission shaft 101 is provided with a small-diameter pulley 101a, the second transmission shaft 102 is provided with a large-diameter pulley 102a and a small-diameter pulley 102b, the third transmission shaft 103 is provided with a large-diameter pulley 103a and a small-diameter gear 103b, and the fourth transmission shaft 104 is provided with a large-diameter gear 104a and a small-diameter gear 104b. When torque is transmitted from the motor cover 21 of the second motor 20 to the first transmission shaft 101 through the irreversible rotation transmission body 110, the torque is transmitted from the small-diameter pulley 101a of the first transmission shaft 101 to the large-diameter pulley 102a of the second transmission shaft 102 through a first transmission belt 105 and is transmitted from the small-diameter pulley 102b of the second transmission shaft 102 to the large-diameter pulley 103a of the third transmission shaft 103 through a second transmission belt 106. The torque is transmitted from the small-diameter gear 103b of the third transmission shaft 103 to the large-diameter gear 104a of the fourth transmission shaft 104 and is further transmitted from the small-diameter gear 104b of the fourth transmission shaft 104 to a small-diameter gear 30a provided in the main body case 30. The small-diameter gear 30a is disposed on the same axis of the revolving shaft 61 and the small-diameter gear 61a of the hub case 60, so that, when torque is input to the small-diameter gear 30a, the main body case 30 is tilted back and forth by a reaction force. Together with the second motor 20, the balancing torque transmission mechanism 100 constitutes a center-of-gravity moving mechanism 200.

(Irreversible Rotation Transmission Body)

Figure 5A:
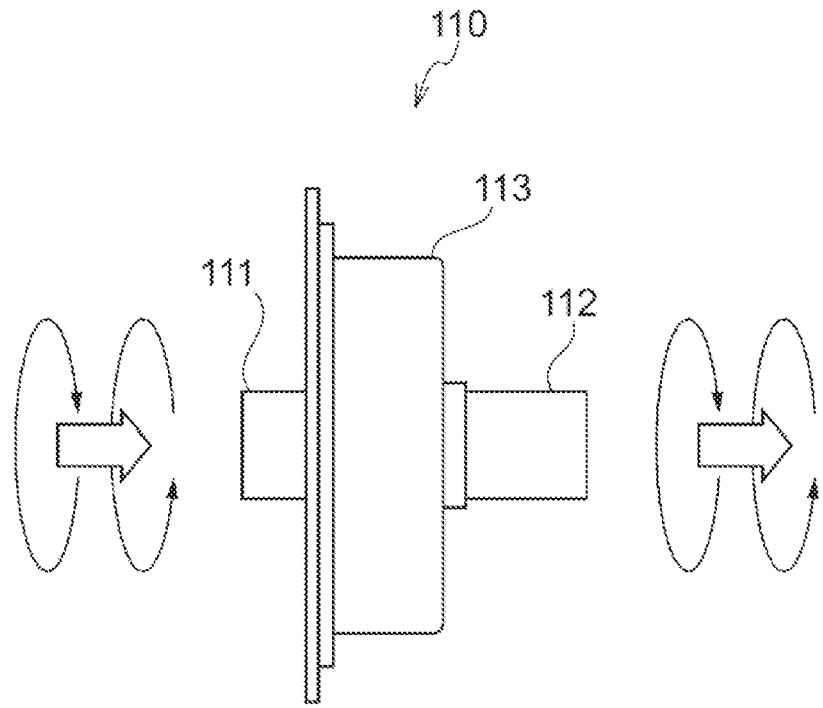
FIGS. 5A and 5B are explanatory views schematically illustrating an operation of an irreversible rotation transmission body of the walking support device of FIG. 1.
Figure 5B:
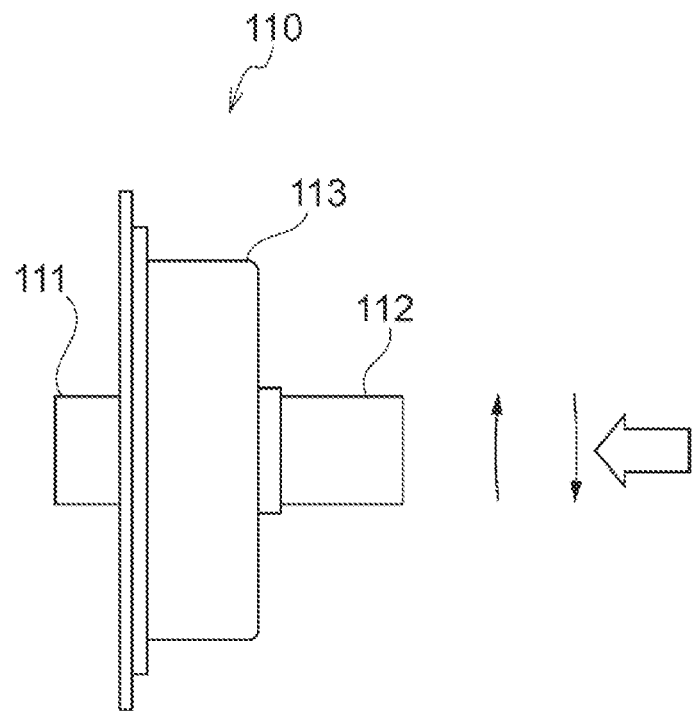

As illustrated in FIGS. 5A and 5B, the irreversible rotation transmission body 110 has an input shaft 111, an output shaft 112, and an outer ring member 113. The irreversible rotation transmission body 110 is a mechanical element whose characteristic is that, in a state where the outer ring member 113 is fixed, when the input shaft 111 is rotated, the output shaft 112 also rotates, and when an output shaft 112 side is rotated, the output shaft 112 itself is locked, so as not to transmit torque to the input shaft 111. For example, a lock-type TORQUE DIODE (registered trademark), manufactured by NTN Corporation. Since FIGS. 5A and 5B are schematic views for illustrating the operation of the irreversible rotation transmission body 110, shape of the irreversible rotation transmission body 110 of FIGS. 5A and 5B differs from that illustrated in FIG. 3.

In the present embodiment, the outer ring member 113 of the irreversible rotation transmission body 110 is not fixed, but used as three rotating elements as described below. Specifically, the motor cover 21 (stator 22) of the second motor 20 is connected to the input shaft 111 of the irreversible rotation transmission body 110, the main body case 30 is connected to the output shaft 112 through the balancing torque transmission mechanism 100, and the hub case 60 is connected to the outer ring member 113 through the rotor shaft 24 (rotor 23) of the second motor 20 and the revolving torque transmission mechanism 90.

Figure 6A:
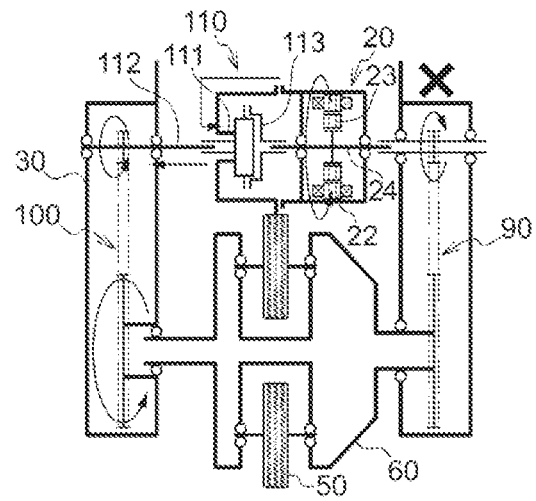
FIGS. 6A to 6C are explanatory views illustrating behaviors of the irreversible rotation transmission body each corresponding to a situation of the walking support device of FIG. 1.

When the irreversible rotation transmission body 110 is used in this manner, as illustrated in FIG. 6A, during the normal walking where the two drive wheels 50 are grounded and the hub case 60 does not rotate (FIG. 12A), if the second motor 20 is energized, the rotor 23 of the second motor 20, which is connected to the hub case 60, is fixed, so that the stator 22 of the second motor 20 rotates by a reaction force. Since the stator 22 is connected to the input shaft 111 of the irreversible rotation transmission body 110 through the motor cover 21, rotation of the stator 22 produces rotation of the input shaft 111 of the irreversible rotation transmission body 110. The rotation of the input shaft 111 produces rotation of one with smaller load of the outer ring member 113, whose load is larger due to the grounding of the two drive wheels 50, and the output shaft 112, to which the main body case 30 is connected, that is, output shaft 112, to which the main body case 30 is connected. Therefore, during the normal traveling, torque of the second motor 20 is transmitted to the output shaft 112 of the irreversible rotation transmission body 110, and the main body case 30 is tilted back and forth so that the center-of-gravity position of the main body case 30 stays in a proper position.

Figure 6B:
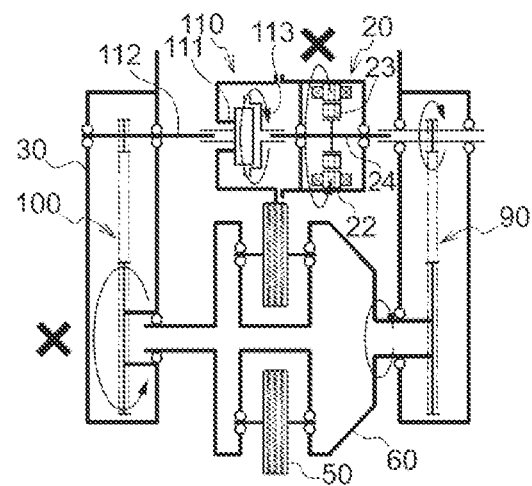

As illustrated in FIG. 6B, when climbing over a step (FIGS. 12C and 12D) or going up or down stairs (FIG. 4B), in a state where the two drive wheels 50 out of the three drive wheels 50 are floating, the main body case 30 is prevented from tilting backward by the user gripping the gripping unit 40, so that the output shaft 112, to which the main body case 30 is connected, is prevented from rotating. When the second motor 20 is energized in this state, the rotor 23 of the second motor 20 rotates, and rotation of the rotor 23 produces rotation of the hub case 60 through the rotor shaft 24 and the revolving torque transmission mechanism 90. Therefore, when climbing over a step or going up or down stairs, torque of the second motor 20 is transmitted to the hub case 60, the hub case 60 rotates, and the drive wheels 50 revolve.

Figure 6C:
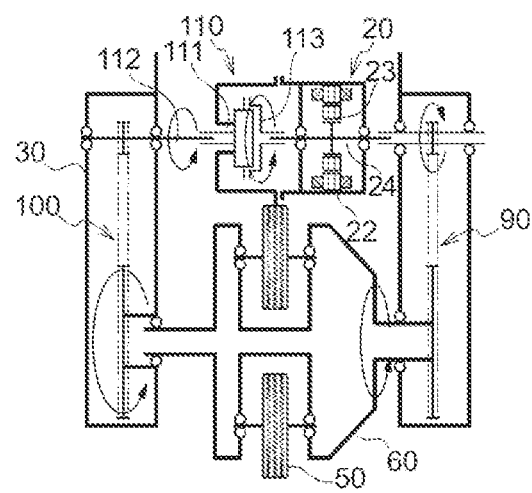

As illustrated in FIG. 6C, when the walking support device 1 is stumbling over a step (FIG. 12B), a forward inertial force is input to the main body case 30 by the user gripping the gripping unit 40. Since the main body case 30 is connected to the output shaft 112 of the irreversible rotation transmission body 110, rotation of the main body case 30 produces rotation of the output shaft 112, to which the main body case 30 is connected. The rotation of the output shaft 112 produces rotation of the input shaft 111 and the outer ring member 113 integrally together with the output shaft 112. When the input shaft 111 rotates together with the main body case 30, the stator 22 of the second motor 20, which is connected to the input shaft 111, rotates, and the rotor 23 of the second motor 20, which is connected to the outer ring member 113 and the hub case 60, rotates integrally. Therefore, when the walking support device 1 is stumbling over a step, the main body case 30 and the hub case 60 are in a coupled state, a forward inertial force acting on the main body case 30 causes the rear one of the two grounded wheels 50 to float with the front one of the grounded drive wheels 50 a fulcrum.

(Control Unit)

Figure 7:
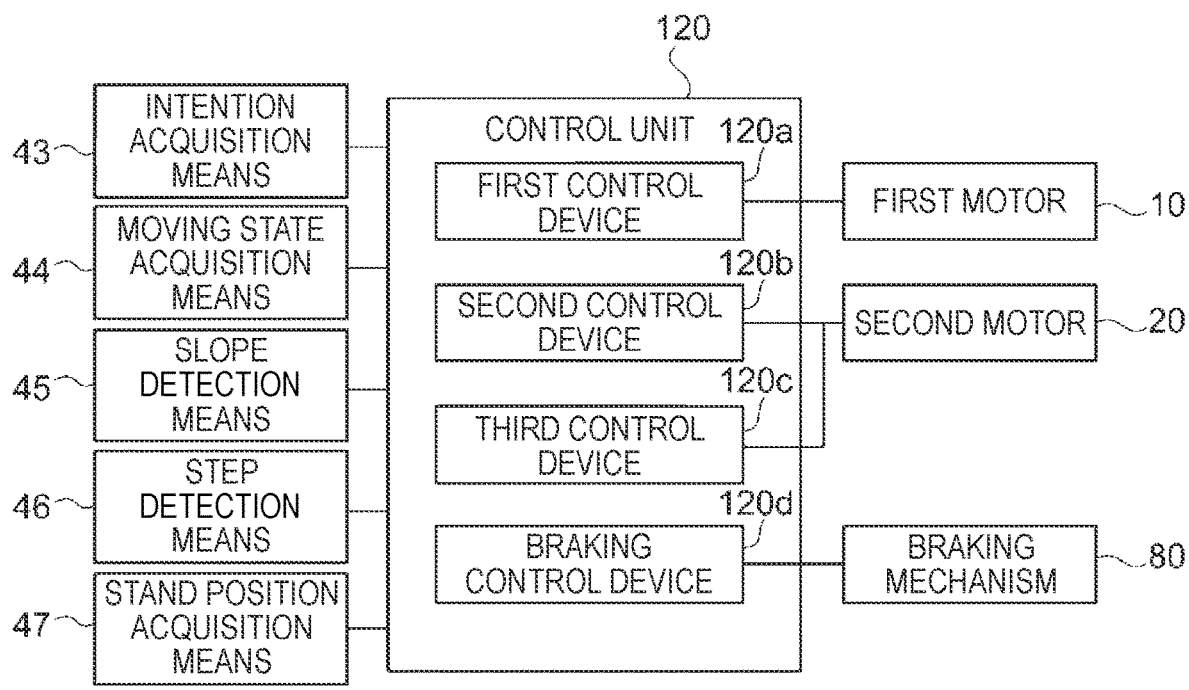
FIG. 7 is a block diagram illustrating a control configuration of the walking support device of FIG. 1.

As illustrated in FIG. 7, the control unit 120 includes: a first control device 120a configured to control the first motor 10 to control rotation of the three drive wheels 50; a second control device 120b configured to control the second motor 20 to control rotation of the hub case 60; a third control device 120c configured to control the second motor 20 to control the center-of-gravity position of the main body case 30; and a braking control device 120d configured to control actuation of the braking mechanism 80. The control unit receives user's using and non-using intention which are input from the intention acquisition means 43, traveling state of the walking support device 1 which is input from the traveling state acquisition means 44, slope information of a surface on which the walking support device 1 travels which is input from the slope detection means 45, step information of a surface on which the walking support device 1 travels which is input from the step detection means 46, and position information of the stand 37 which is input from the stand position acquisition means 47.

When the intention acquisition means 43 acquires user's intention to start traveling forward or to accelerate forward in the traveling direction, the first control device 120a controls rotation so that traction in the forward direction increases on the plurality of drive wheels 50. Meanwhile, when the intention acquisition means 43 acquires user's intention to decelerate forward in the traveling direction or to start traveling backward in the direction opposite to the traveling direction, the first control device 120a controls rotation so that traction in the forward direction decreases or traction in the backward direction increases on the plurality of drive wheels 50. Therefore, the walking support device 1 can travel forward according to user's intention to start traveling forward or to accelerate forward in the traveling direction and can decelerate or travel backward according to user's intention to decelerate forward in the traveling direction or to start traveling backward in the direction opposite to the traveling direction. The first control device 120a can regeneratively control the first motor 10 when controlling rotation so that the traction in the traveling direction decreases on the plurality of drive wheels 50.

The first control device 120a controls rotation so that traction in the forward direction increases on the plurality of drive wheels 50 when the slope detection means 45 detects an uphill of a surface in front in the traveling direction of the walking support device 1. Meanwhile, the first control device 120a controls rotation so that traction in the forward direction decreases on the plurality of drive wheels 50 when the slope detection means 45 detects a downhill of a surface in front in the traveling direction of the walking support device 1.

The second control device 120b controls revolution so as to generate torque for controlling rotation of the hub case 60 when the step detection means 46 detects a step in front in the traveling direction of the walking support device 1. As will be described in detail later, by revolving the plurality of drive wheels 50 according to a step, the walking support device 1 can easily climb over the step.

The third control device 120c is configured to control balance so that the center-of-gravity position of the main body case 30 stays in a proper position.

The braking control device 120d controls to prohibit the braking mechanism 80 from being actuated when the traveling state acquisition means 44 detects traveling of the walking support device 1. The braking control device 120d controls the braking mechanism 80 to be actuated when the intention acquisition means 43 acquires user's intention to decelerate forward or to stop during traveling of the walking support device 1.

The braking control device 120d controls the braking mechanism 80 to be actuated when the intention acquisition means 43 does not acquire user's using intention or acquires user's non-using intention. Furthermore, the braking control device 120d controls the braking mechanism 80 to be unactuated when the intention acquisition means 43 acquires user's intention to start traveling forward in the traveling direction while the walking support device 1 is stopped.

Furthermore, the braking control device 120d is configured to control actuation of the braking mechanism 80 according to a state of the stand 37. More specifically, the braking control device 120d controls the braking mechanism 80 to be actuated when the stand position acquisition means 47 determines that the stand 37 is positioned at the lower position or acquires transition from the upper position to the lower position. Meanwhile, the braking control device 120d controls the braking mechanism 80 to be unactuated when the stand position acquisition means 47 determines that the stand 37 is not positioned at the lower position or is positioned at the upper position. By controlling the braking mechanism 80 according to the position of the stand 37, it is possible to prevent the walking support device 1 from moving when the stand 37 is in an operating state and from being restricted from moving when the stand 37 is in a non-operating state.

[Arrangement Configuration of Walking Support Device]

Figure 2A:
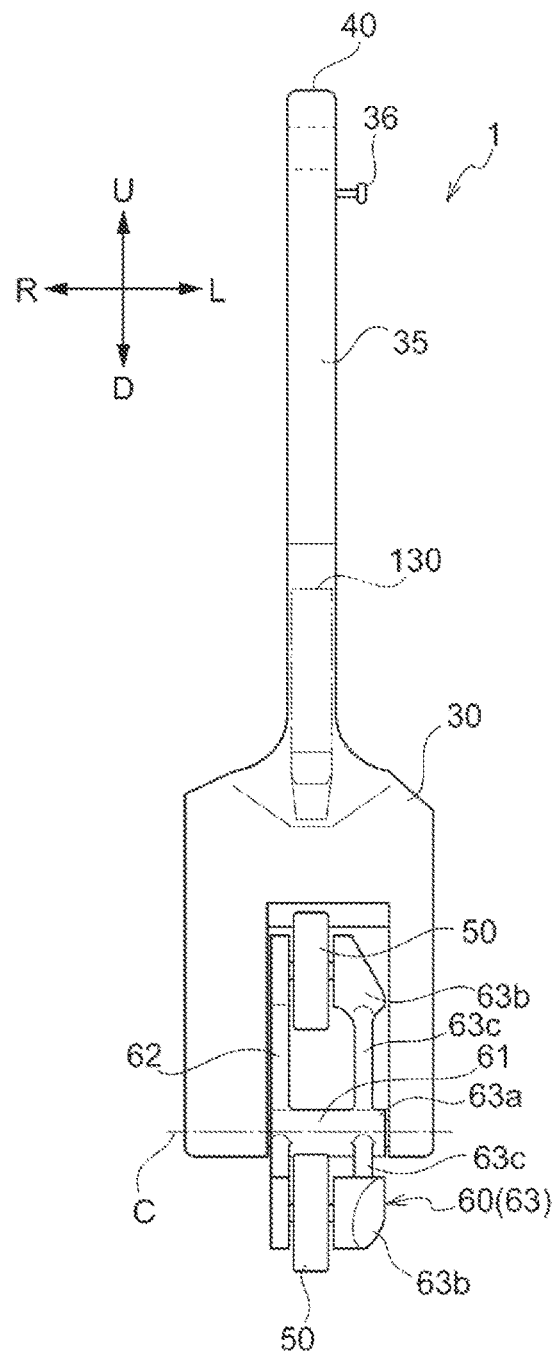
FIGS. 2A and 2B illustrate a walking support device of FIG. 1.
Figure 2B:
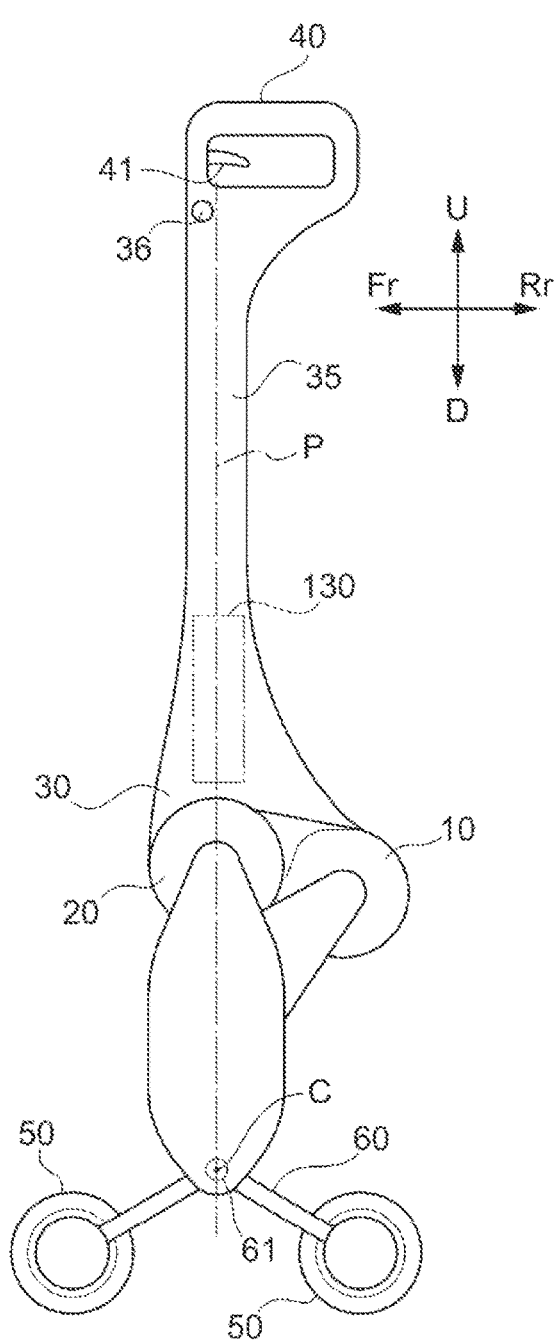
Figure 3:
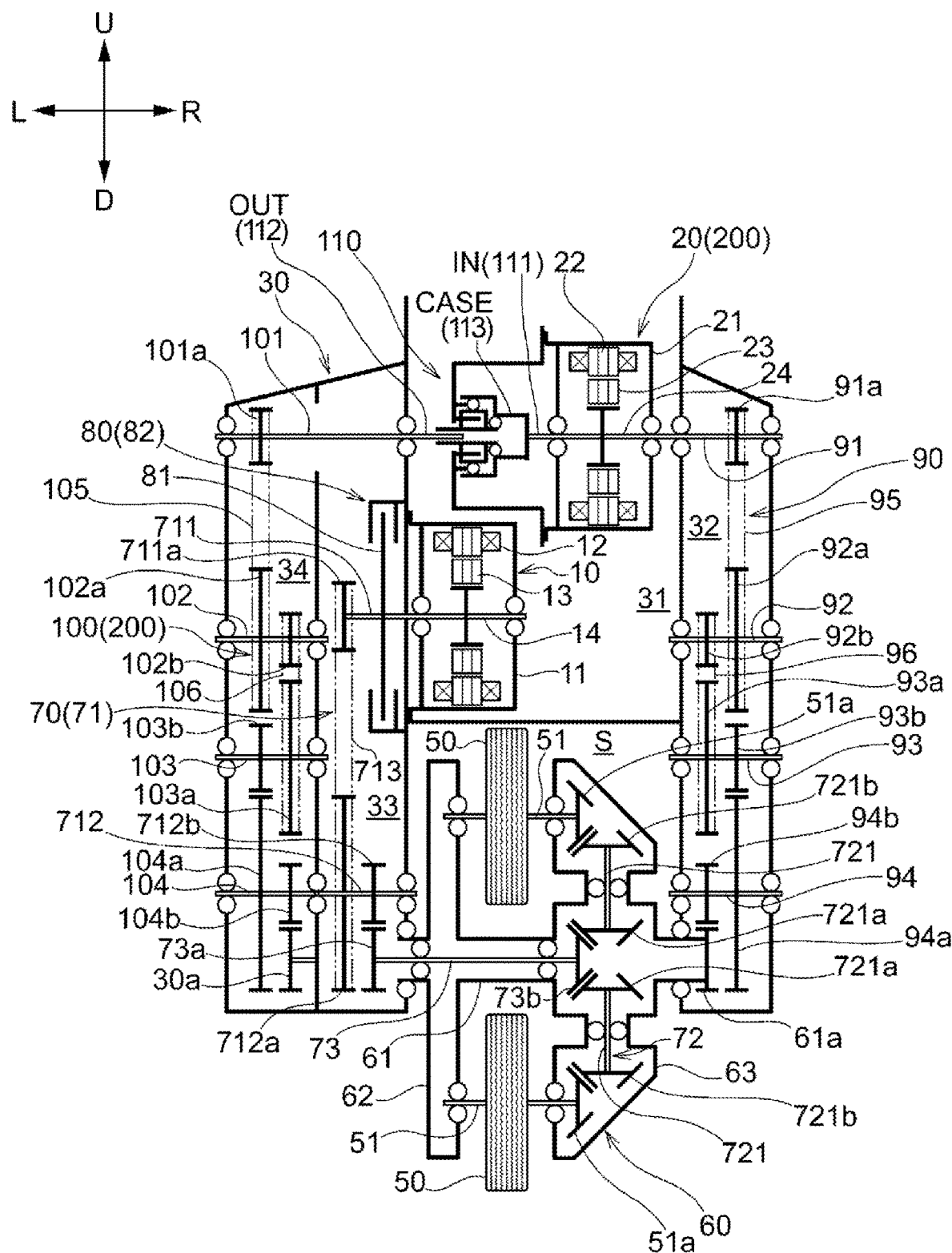
FIG. 3 is a skeleton view illustrating a torque transmission mechanism of the walking support device of FIG. 1 and arrangement thereof.

Next, an arrangement configuration of each unit of the walking support device 1 will be described with reference to FIGS. 1 to 3. Arrangement of the left and right sides may be reversed. Similarly, arrangement of the front and rear sides may be reversed.

The rotating torque transmission mechanism 70 and the balancing torque transmission mechanism 100 are disposed on the left side of the plurality of drive wheels 50 in the width direction of the walking support device 1, and the revolving torque transmission mechanism 90 is disposed on the right side of the plurality of drive wheels 50. By disposing the rotating torque transmission mechanism 70, the balancing torque transmission mechanism 100, and the revolving torque transmission mechanism 90 on both sides across the plurality of drive wheels 50, these can be disposed in a balanced manner. Although, in the present embodiment, the rotating torque transmission mechanism 70 is disposed between the balancing torque transmission mechanism 100 and the plurality of drive wheels 50, the rotating torque transmission mechanism 70 may be disposed between the revolving torque transmission mechanism 90 and the plurality of drive wheels 50.

The first motor 10 is disposed on the right side of the rotating torque transmission mechanism 70 and the balancing torque transmission mechanism 100, and the second motor 20 is disposed on the left side of the revolving torque transmission mechanism 90. That is, the first motor 10 and the second motor 20 are disposed between the rotating torque transmission mechanisms 70 and the revolving torque transmission mechanism 90 and between the balancing torque transmission mechanism 100 and the revolving torque transmission mechanism 90 in the width direction. Therefore, the first motor 10 and the second motor 20 are prevented from sticking out in the width direction.

The first motor 10 and the second motor 20 are disposed outside a revolution orbit of the plurality of drive wheels 50, which are supported by the hub case 60, and are disposed between one end portion of the revolution orbit and the other end portion in the traveling direction of the walking support device 1.

Furthermore, when viewed from the width direction, the second motor 20 is disposed so as to overlap a virtual vertical line P passing through the axis C in an upright posture where the main body case 30 stands along the vertical direction. Meanwhile, the first motor 10 is disposed on the rear side in the traveling direction of the walking support device 1 with respect to the virtual vertical line P in the upright posture. By disposing the first motor 10 and the second motor 20 to be staggered in the traveling direction of the walking support device 1 in this manner, it is possible to suppress the walking support device 1 from getting bigger in the shaft direction (the left-right direction).

The battery 130, which is configured to supply electricity to the first motor 10 and the second motor 20, is accommodated in the tubular unit 35 of the main body case 30 and is disposed between the gripping unit 40 and the first motor 10 and between the gripping unit 40 and the second motor 20.

[Control Method of Walking Support Device]

Next, the control method of the walking support device 1 will be described with reference to FIGS. 8 to 10.

Figure 8:
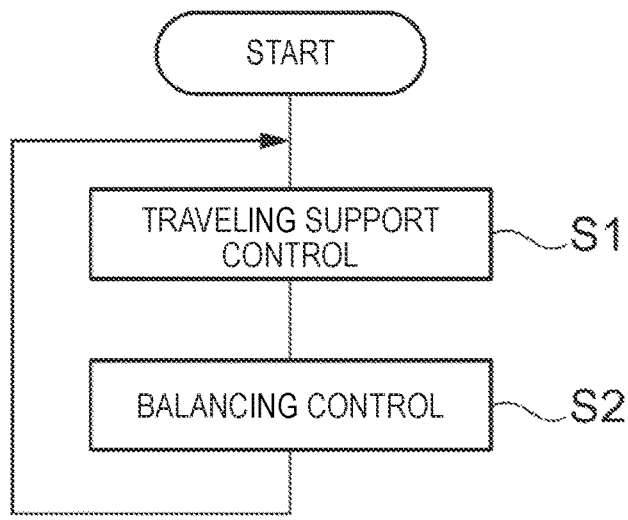
FIG. 8 is a flowchart illustrating a control method (main routine) of the walking support device of FIG. 1.

As illustrated in FIG. 8, the control unit 120 is activated according to the user's using intention (for example, to turn on a power switch) and repeatedly executes traveling support control (S1) and balancing control (S2). Either or both of the traveling support control (S1) and the balancing control (S2) can be executed at once. The traveling support control is a control for controlling the first motor 10, the second motor 20, and the braking mechanism 80 to support the traveling of the walking support device 1 in the traveling direction according to user's traveling intention, and the balancing control is a control for controlling the second motor 20 to balance the center of gravity in the traveling direction of the walking support device 1. Hereinafter, the specific control procedures for the traveling support control and the balancing control will be described with reference to FIGS. 9 and 10.

Figure 9:
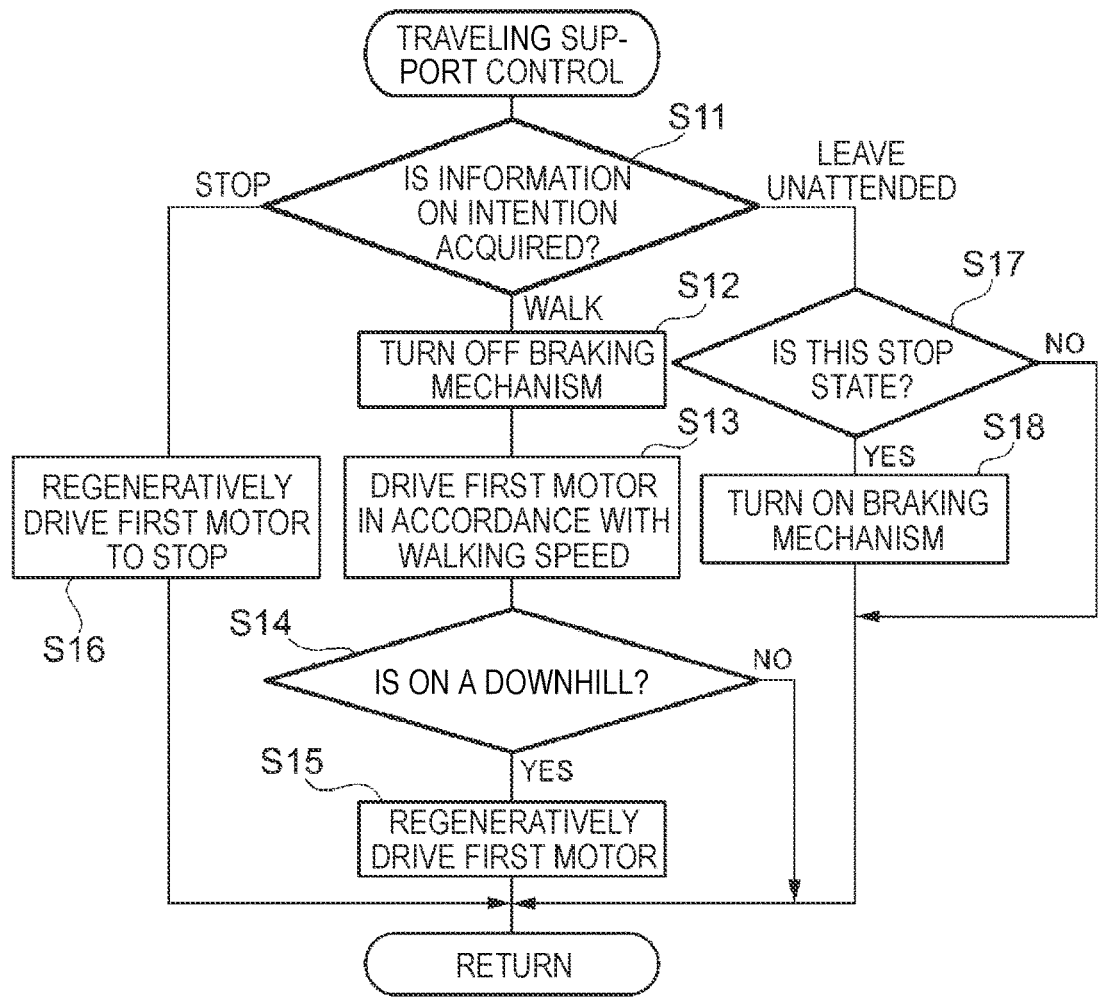
FIG. 9 is a flowchart illustrating a control method (traveling support control) of the walking support device of FIG. 1.

As illustrated in FIG. 9, the control unit 120 in the traveling support control first acquires information on user's traveling intention (S11). In walking support control of the present embodiment, "Walk," "Stop," and "Leave Unattended" are acquired as information on user's traveling intention. "Walk" is information representing user's intention to move the walking support device 1 forward in the traveling direction and is acquired, in the present embodiment, based on motion (determined by a pressure sensor in the present embodiment) of pushing the gripping unit 40 forward. "Stop" is information representing user's intention to stop traveling of the walking support device 1 and is acquired, in the present embodiment, based on motion (determined by a pressure sensor in the present embodiment) of pulling the gripping unit 40 backward. "Leave Unattended" is information representing intention to shift the walking support device 1 to an unattended state and is acquired based on handling of the operation lever 41.

In a case where "Walk" is acquired as intention information, the control unit 120 turns off (released state) the braking mechanism 80 (S12) and controls the first motor 10 to adjust rotation of the drive wheels 50 to user's walking speed (S13). In a situation where "Walk" is acquired as intention information, the control unit 120 determines whether the walking support device 1 is on a downhill or not (S14: determined by the slope detection means 45 in the present embodiment), and if determination result is YES, the control unit 120 regeneratively drives the first motor 10 so as to decelerate rotation of the drive wheels 50 (S15). In a case where it is determined that the walking support device 1 is not on a downhill in S14, if the walking support device 1 is on a flat road, the first motor 10 is driven as usual, and if the walking support device 1 is on an uphill, the first motor 10 is driven so that traction in the forward direction increases more than on a flat road.

In a case where "Stop" is acquired as intention information, the control unit 120 regeneratively drives the first motor 10 to decelerate rotation of the drive wheels 50 and stops the rotation of the drive wheels 50 (S16). In a case where "Leave Unattended" is acquired as intention information, the control unit 120 determines Whether the first motor 10 (the drive wheels 50) is stopped or not (S17), and if determination result is YES, the braking mechanism 80 is turned on (braking state) (S18). Action and effect of the traveling support control will be described later.

Figure 10:
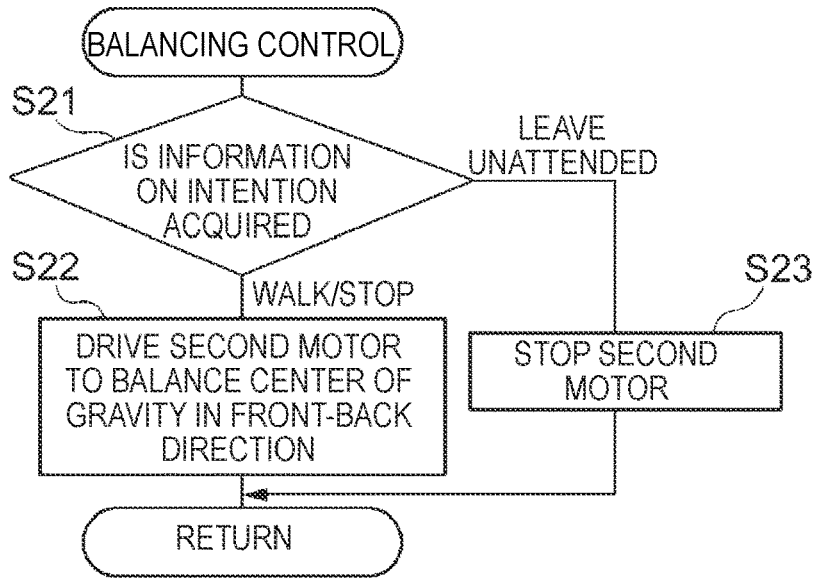
FIG. 10 is a flowchart illustrating a control method (balancing control) of the walking support device of FIG. 1.

As illustrated in FIG. 10, the control unit 120 in the balancing control first acquires information on user's traveling intention (S21). In a case where "Walk" or "Stop" is acquired as intention information, the control unit 120 controls the second motor 20 to balance the center of gravity in the traveling direction of the walking support device 1 (S22). In a case where "Leave Unattended" is acquired as intention information, the control unit 120 stops rotation of the second motor 20 (S23). Action and effect of the balancing control will be described later.

[Operation of Walking Support Device]

Next, operation of the walking support device 1 will be described with reference to FIGS. 11 to 15.

(From Unattended State to on State)

As illustrated in FIGS. 11A and 11B, when the user turns on a power switch to boot up the walking support device 1, the breaking mechanism 80 in an ON state prevents the drive wheels 50, which are grounded by two wheels, from rotating, and the stand 37 in the open state, where the stand 37 is positioned in the lower position, prevents the main body case 30 from tipping in the left-right direction.

As illustrated in FIGS. 11C and 11D, in a case where the luggage B was loaded onto the walking support device 1, the hook unit 36 protrudes from the tubular unit 35 of the main body case 30, and the user hangs the luggage B on the hook unit 36 with one hand while supporting the main body case 30 (the gripping unit 40) with the other hand. When the luggage B is hung on the hook unit 36, the center of gravity of the walking support device 1 including the luggage in the front-rear direction shifts forward, and the center of gravity in the left-right direction shifts to either the left or right side. For example, in a case where the user walks on the right side of the walking support device 1 while gripping the gripping unit 40 with the left hand and hangs the luggage B on the left side of the main body case 30, the center of gravity in the left-right direction shifts to the left.

As illustrated in FIGS. 11E and 11F, in a walking preparation phase, first, while supporting the main body case 30 (the gripping unit 40) tipping in the left-right direction with one hand, the user moves the stand 37 to the upper position with the other hand or a foot to make the stand 37 in a closed state. Therefore, restriction of rotation of the drive wheels 50 by the braking mechanism 80 is released, and the control unit 120 starts the traveling support control and the balancing control. When the balancing control is started, the control unit 120 controls the second motor 20 to balance the center of gravity in the front-rear direction of the walking support device 1. Therefore, torque of the second motor 20 is transmitted to the main body case 30 through the balancing torque transmission mechanism 100, and the main body case 30 is tilted backward.

(From Start of Walking to Step Climbing)

As illustrated in FIG. 12A, when the user starts walking, the user transmits a force to advance to the gripping unit 40 (forward push motion). When the intention acquisition means 43 acquires "Walk" as user's intention information, the control unit 120 controls the first motor 10 so that the drive wheels 50 rotate in accordance with user's walking speed (speed at which the force to advance is offset). The control unit 120 keeps balancing the center of gravity in the front-rear direction of the walking support device 1 by controlling the second motor 20 through the balancing control.

As illustrated in FIG. 12B, during walking, in a case where the front one of drive wheels 50 hits a step difficult for the walking support device 1 to climb over only by rotation, an inertial force and a force of the user to advance forward get the walking support device 1 into a stumbling state where the main body case 30 tips forward. As described above, in the stumbling state, the main body case 30 and the hub case 60 are coupled to each other by the irreversible rotation transmission body 110, and the rear one of the two grounded wheels 50 is permitted to float with the front one of the grounded drive wheels 50 a fulcrum.

As illustrated in FIGS. 12C and 12D, when the main body case 30 is tilted forward due to stumbling, as described above, torque of the second motor 20 is transmitted to the hub case 60, the hub case 60 rotates, and the drive wheels 50 revolves, thereby climbing over a step being possible.

(Stop)

Figure 13A:
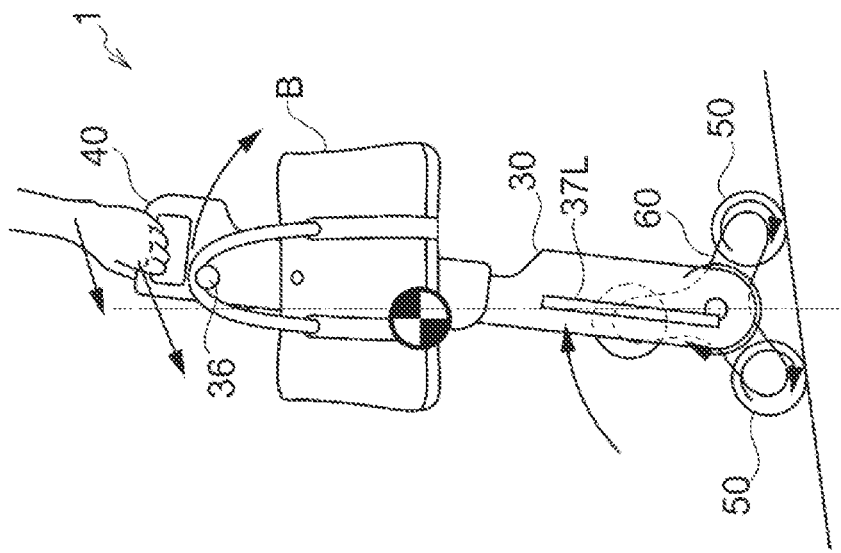
FIGS. 13A and 13B are explanatory views illustrating the operation of the walking support device of FIG. 1.

As illustrated in FIG. 13A, when the user stops walking, the user transmits a force to stop to the gripping unit 40 (backward pulling motion). When the intention acquisition means 43 acquires "Stop" as user's intention information, the control unit 120 regeneratively drives the first motor 10 to decelerate rotation of the drive wheels 50 in the traveling support control and stops the rotation of the drive wheels 50. The control unit 120 keeps balancing the center of gravity in the front-rear direction of the walking support device 1 by controlling the second motor 20 through the balancing control.

(Downhill)

Figure 13B:
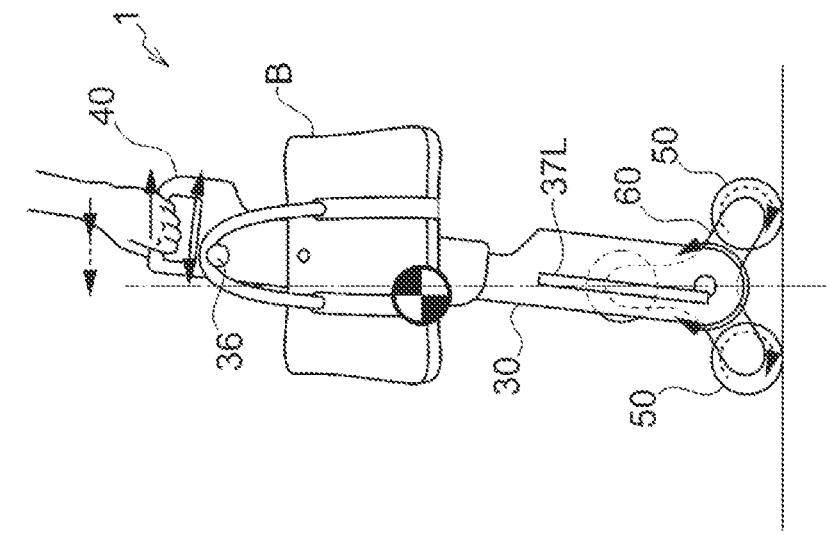

As illustrated in FIG. 13B, in a case where the drive wheels 50 going down a downhill, the control unit 120 keeps balancing the center of gravity in the front-rear direction of the walking support device 1 by controlling the second motor 20 through the balancing control, so that the main body case 30 is tilted backward against a walking path. When the slope detection means 45 detects that the walking support device 1 is on a downhill, the control unit 120 regeneratively drives the first motor 10 to decelerate rotation of the drive wheels 50, so as to adjust the rotation of the drive wheels 50 to users walking speed.

(Going Up Stairs)

As illustrated in FIG. 14A, during walking, in a case where the front one of drive wheels 50 hits upward stairs, the inertial force and a force of the user to advance forward cause a stumbling state where the main body case 30 is tilted forward. As described above, in the stumbling state, the main body case 30 and the hub case 60 are coupled to each other by the irreversible rotation transmission body 110, and the rear one of the two grounded drive wheels 50 is permitted to float with the front one of the grounded drive wheels 50 a fulcrum.

As illustrated in FIG. 14B, when the main body case 30 is tilted forward due to stumbling, as described above, torque of the second motor 20 is transmitted to the hub case 60, the hub case 60 rotates, and the drive wheels 50 revolves. Accordingly, the drive wheels 50 land on the next step of the upward stairs. When the drive wheels 50 land on the step of the upward stairs, the walking support device 1 goes up the step of the upward stairs by torque of the drive wheels 50, torque of the hub case 60, and a force of the user to go up the stairs.

As illustrated in FIG. 14C, after the walking support device 1 goes up the step of the upward stairs, the front one of the drive wheels 50 hits the next step of the upward stairs, and the operation in FIGS. 14A and 14B is repeated, thereby going up a plurality of steps of the upward stairs being possible.

(Going Down Stairs)

As illustrated in FIG. 15A, during the walking, in a case where the front one of drive wheels 50 reaches downward stairs, the front one of the drive wheels 50 gets off a step. At this time, since only the rear one of the drive wheels 50 is grounded and it is prevented the main body case 30 from tilting backward by the user gripping the gripping unit 40, torque of the second motor 20 is transmitted to the hub case 60, the hub case 60 rotates, and the drive wheels 50 revolves. Accordingly, the walking support device 1 starts going down the downward stairs.

As illustrated in FIGS. 15B and 15C, after one of the drive wheels 50 lands on the next step of the stairs, two of the drive wheels 50 get grounded again. Then, when the front one of the drive wheels 50 gets off the next step of the downward stairs, the operation in FIGS. 15A and 15B is repeated, thereby going down a plurality of steps of the downward stairs being possible.

Effect of Embodiment

In this manner, the walking support device 1 includes: the plurality of drive wheels 50 capable of rotating around the plurality of rotating shafts 51 disposed on the circumference around the common axis C; and the hub case 60 supporting the plurality of rotating shafts 51 to be capable of revolving around the axis C, in which the first motor 10 is connected to the plurality of drive wheels 50 to be capable of trans- mitting torque so as to rotate the plurality of drive wheels 50, and the second motor 20 is connected to the hub case 60 to be capable of transmitting torque so as to revolve the plurality of drive wheels 50. Accordingly, the user can move the walking support device 1 properly, the first motor 10 and the second motor 20 rotating or revolving the plurality of drive wheels 50. Since the hub case 60 supports the plurality of rotating shafts 51 to be capable of revolving around the axis C, the plurality of drive wheels 50 can be revolved even when not locked, and the user can move the walking support device 1 properly.

The second motor 20 is connected to, in addition to the hub case 60, the main body case 30 to be capable of transmitting torque. Therefore, the plurality of drive wheels 50 rotating, balance of the main body case 30 can be properly maintained.

The walking support device 1 includes the braking mechanism 80 provided in at least one of the plurality of drive wheels 50, the first motor 10, and the rotating torque transmission mechanism 70. Accordingly, the braking mechanism 80 can stop rotation of the plurality of drive wheels 50, and the walking support device 1 can be reliably stopped.

Second Embodiment

In the walking support device 1 of the first embodiment, the second motor 20 is connected to the revolving torque transmission mechanism 90 and the balancing torque transmission mechanism 100 through the irreversible rotation transmission body 110, and accordingly, forward traveling and balancing control during normal traveling, integral rotation when the walking support device 1 is stumbling over a step, and revolution when the walking support device 1 is climbing over a step are realized by the two power sources of the first motor 10 and the second motor 20. However, the present invention is not limited thereto.

Figure 16:
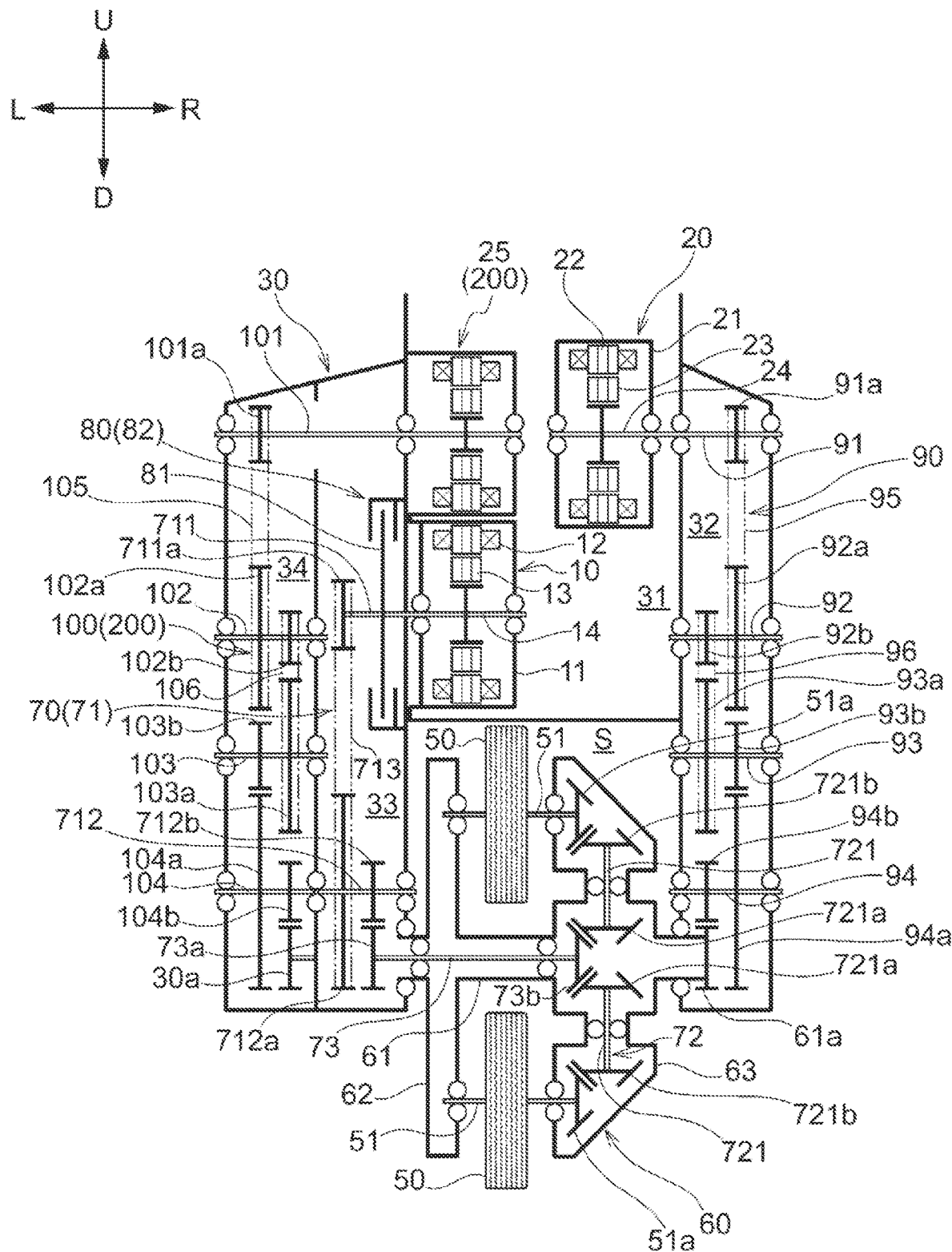
FIG. 16 is a skeleton view illustrating a torque transmission mechanism of a walking support device of a second embodiment and arrangement thereof.

In a walking support device 1 of the second embodiment, as illustrated in FIG. 16, the first motor 10 is connected to the plurality of drive wheels 50 to be capable of transmitting torque so as to rotate the plurality of drive wheels 50, the second motor 20 is connected to the hub case 60 to be capable of transmitting torque to revolve the plurality of drive wheels 50, and a third motor 25 is connected to the main body case 30 to be capable of transmitting torque. That is, the center-of-gravity moving mechanism 200 is config- ured with the third motor 25 and the balancing torque transmission mechanism 100. By controlling the first motor 10, the second motor 20, and the third motor 25 in this manner, the travel support control (S1) and the balancing control (S2) can be realized in the same manner as those in the first embodiment. The walking support device 1 of the second embodiment has the third motor 25 instead of the irreversible rotation transmission body 110 in the walking support device 1 of the first embodiment, and the other configurations are the same as those of the first embodiment. Therefore, in FIG. 16, description of the same configurations is omitted with the same reference numerals assigned thereto.

Third Embodiment

A walking support device 1 of the third embodiment realizes the travel support control (S1) and the balancing control (S2) in the same manner as those in the first embodiment and the second embodiment, without the irreversible rotation transmission body 110 of the first embodiment and the third motor 25 of the second embodiment.

Figure 17:
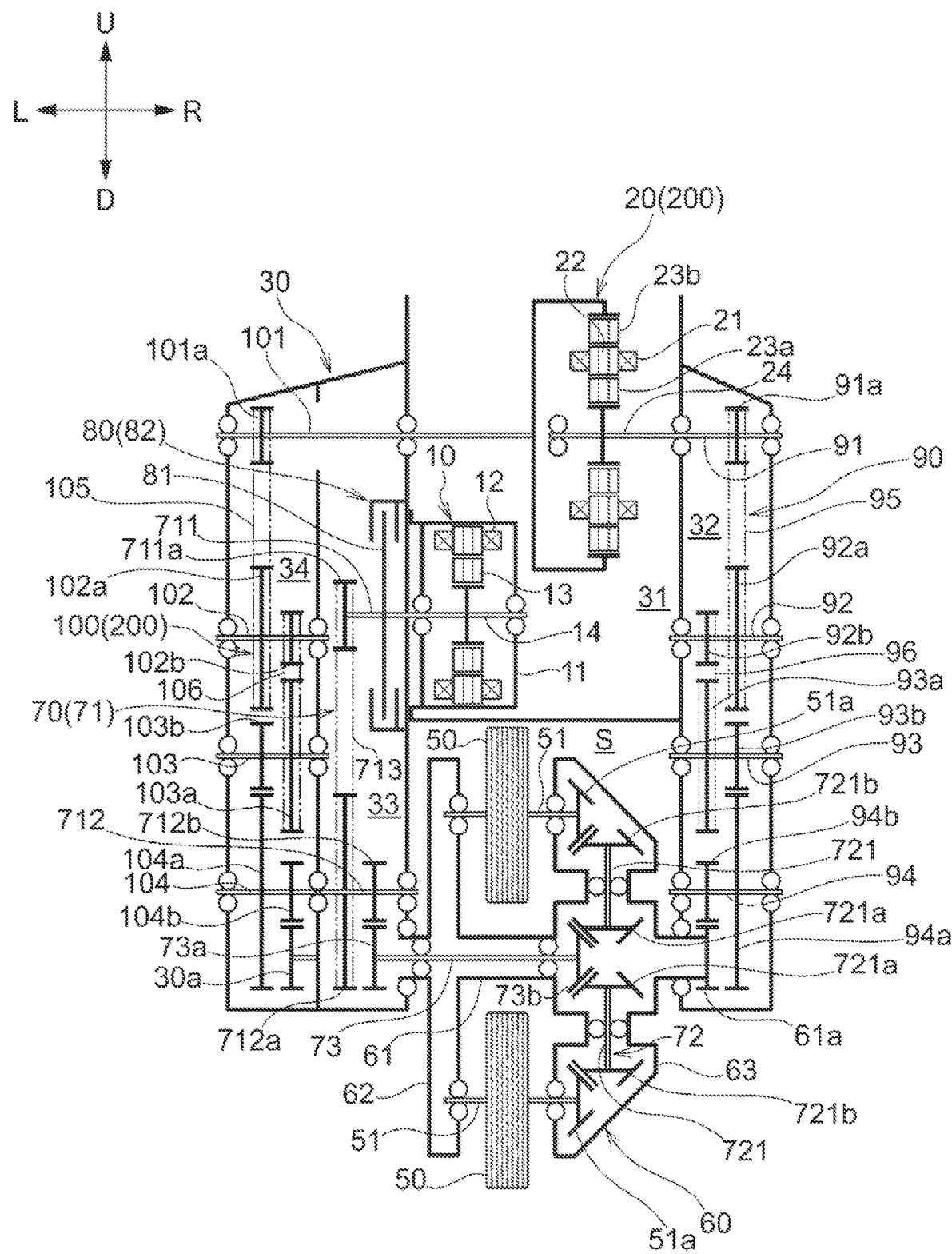
FIG. 17 is a skeleton view illustrating a torque transmission mechanism of a walking support device of a third embodiment and arrangement thereof.

In the walking support device 1 of the third embodiment, as illustrated in FIG. 17, the second motor 20 is an anti-directional twin rotary motor (relative differential motor) with one stator and two rotors configured to rotate reversely, one rotor 23*a* is connected to the hub case 60 to be capable of transmitting, torque so as to revolve the plurality of drive wheels 50, and the other rotor 23*b* is connected to the main body case 30 to be capable of transmitting torque. In the walking support device 1 of the third embodiment, other configurations are the same as those of the first embodiment. Therefore, in FIG. 17, description of the same configurations is omitted with the same reference numerals assigned thereto.

Fourth Embodiment

A walking support device 1 of the fourth embodiment realizes the travel support control (S1) and the balancing control (S2) in the same manner as those in the first embodiment and the second embodiment, without the irreversible rotation transmission body 110 of the first embodiment and the third motor 25 of the second embodiment.

Figure 18:
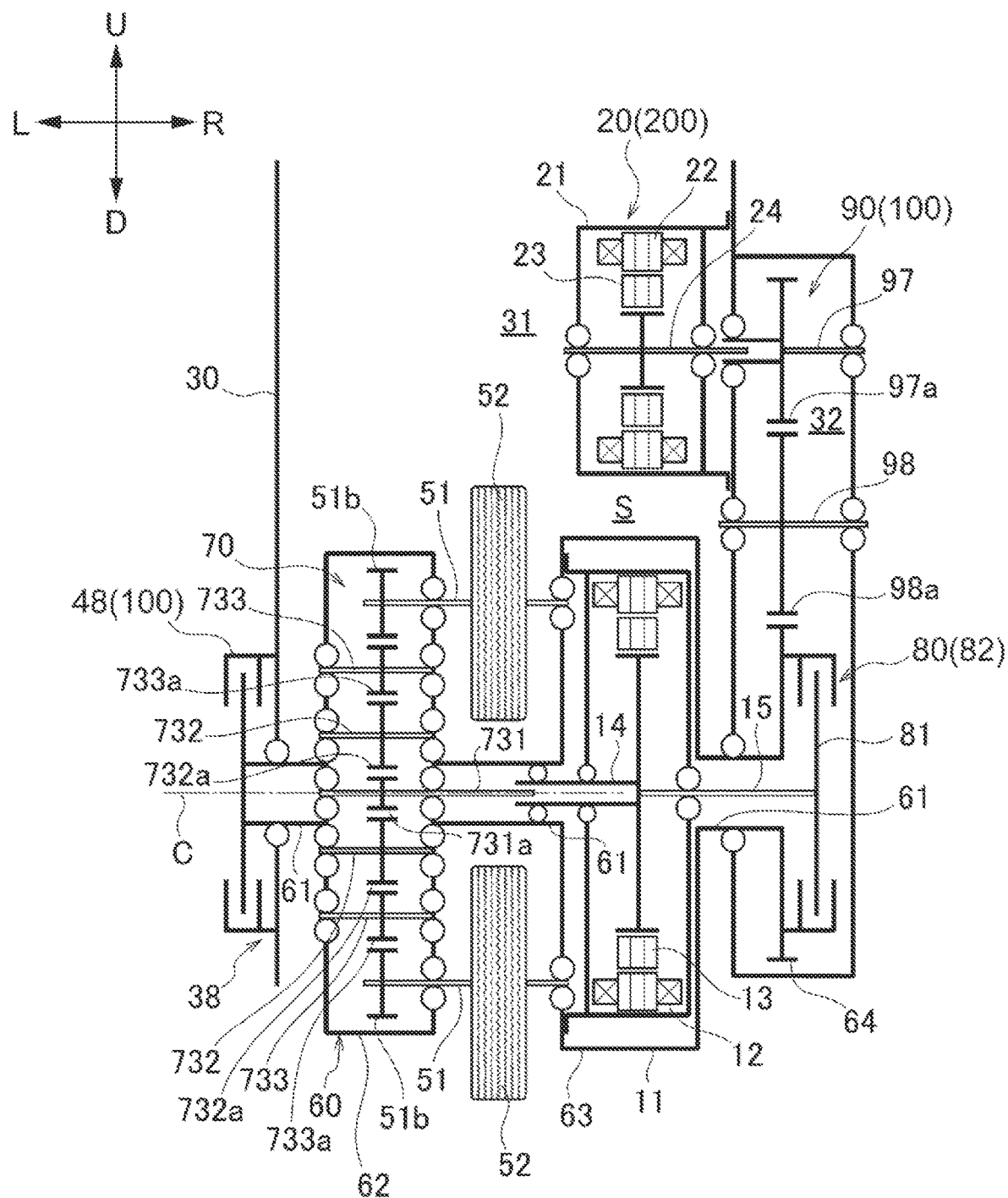
FIG. 18 is a skeleton view illustrating a torque transmission mechanism of a walking support device of a fourth embodiment and arrangement thereof.
Figure 19:
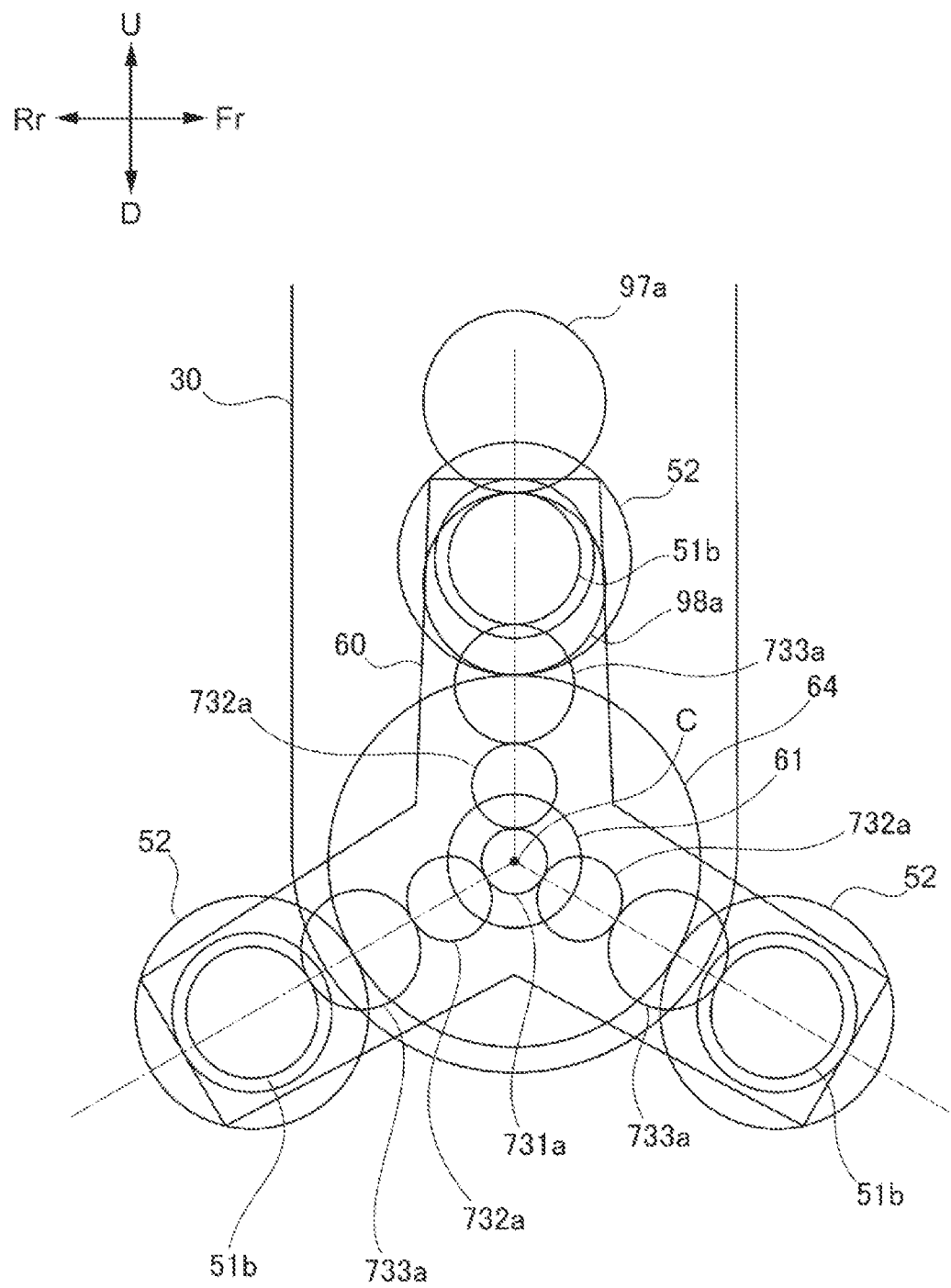
FIG. 19 is a view where the torque transmission mechanism of FIG. 18 is viewed from a shaft direction.

As illustrated in FIGS. 18 and 19, the walking support device 1 according to the fourth embodiment includes: a first motor 10; a second motor 20: a main body case 30 accommodating the first motor 10 and the second motor 20; a plurality of drive wheels 50 capable of rotating around a plurality of rotating shafts 51 disposed on a same circumference around a common axis C; a hub case 60 supported by the main body case 30 and supporting the plurality of rotating shafts 51 to be capable of revolving; a rotating torque transmission mechanism 70 configured to transmit torque from the first motor 10 to the plurality of drive wheels 50; a braking mechanism 80 configured to apply a braking force to the plurality of drive wheels 50; a revolving torque transmission mechanism 90 configured to transmit torque from the second motor 20 to the hub case 60; connection/disconnection means 48 configured to connect the hub case 60 and the main body case 30. Since the control unit 120 and the battery 130 have the same or equivalent configurations as those of the first embodiment, description thereof is omitted.

(First Motor)

The first motor 10 includes: a stator 12 fixed to an inner circumferential portion of a motor cover 11; a rotor 13 rotatably disposed on the inner circumferential side of the stator 12; and a rotor shaft 14 coupled to an inner circumferential portion of the rotor 13 and rotatably supported by the motor cover 11, and torque output from the rotor shaft 14 is transmitted to the plurality of drive wheels 50 through the rotating torque transmission mechanism 70. The motor cover 11 is accommodated in second drive wheel support cases 63 of the hub case 60 and is configured to rotate integrally with the second drive wheel support cases 63.

(Second Motor)

The second motor 20 includes: a stator 22 fixed to an inner circumferential portion of a motor cover 21; a rotor 23 rotatably disposed on the inner circumferential side of the stator 22; and a rotor shaft 24 coupled to the inner circumferential portion of the rotor 23 and rotatably supported by the motor cover 21, and torque output from the rotor shaft 24 is transmitted to the hub case 60 through the revolving torque transmission mechanism 90.

(Main Body Case)

The main body case 30 includes: a motor accommodation unit 31 accommodating the second motor 20; a revolving torque transmission mechanism accommodation unit 32 connected to the right side of the motor accommodation unit 31 and accommodating the revolving torque transmission mechanism 90; and a connection/disconnection means attachment unit 38 disposed on the left side of the motor accommodation unit 31 to which the connection/disconnection means 48 is attached. As described in FIG. 1, the main body case 30 of present embodiment also includes: a gripping unit 40, a hook unit 36, a stand 37, a tubular unit 35 accommodating the battery 130, intention acquisition means 43, traveling state acquisition means 44, slope detection means 45, step detection means 46, stand position acquisition means 47, and the like.

The main body case 30 has a space S for disposing the hub case 60 and the plurality of drive wheels 50 below the motor accommodation unit 31 and between the revolving torque transmission mechanism accommodation unit 32 and the connection/disconnection means attachment unit 38 in the left-right direction. A revolving shaft 61 of the hub case 60 is rotatably supported between the inner surface of a lower end portion of the revolving torque transmission mechanism accommodation unit 32 and the inner surface of a lower end portion of the connection/disconnection means attachment unit 38.

(Rotating Torque Transmission Mechanism)

The rotating torque transmission mechanism 70 has three transmission shafts 731 to 733 rotatably supported in a first drive wheel support case 62 of the hub case 60, and the first transmission shaft 731 is connected to the rotor shaft 14 of the first motor 10. The second transmission shafts 732 and the third transmission shafts 733 are three shafts each spaced 60° apart around the first transmission shaft 731. The first transmission shaft 731 has a first gear 731*a*, the second transmission shafts 732 has second gears 732*a*, and the third transmission shafts 733 has third gears 733*a*. When torque is output from the rotor shaft 14 of the first motor 10 to the first transmission shaft 731, the torque is transmitted from the first gear 731*a* of the first transmission shaft 731 to the second gears 732*a* of the second transmission shafts is transmitted to the third gears 733*a* of the third transmission shafts 733, and is transmitted to fourth gears 51*b* provided in each of the rotating shafts 51 of the drive wheels 50. Accordingly, the three drive wheels 50 can be rotated by controlling the first motor 10.

(Braking Mechanism)

The braking mechanism 80 includes: a disk unit 81 rotatable integrally with the rotor shaft 14 of the first motor 10 and provided on a second rotor shaft 15 extending on the opposite side (right side) of the rotor shaft 14 in the width direction; and a braking unit 82 configured to generate a braking force on the drive wheels 50 by sandwiching an outer circumferential of the disk unit 81 from both the left and right sides. The braking unit 82 has an electrically operated actuator, and the control unit 120 is configured to operate the braking mechanism 80 based on drive control of the actuator. The braking mechanism 80 may be a manual braking mechanism manually mechanically operated without intervention by the control unit 120. As long as it is possible to generate a braking force on the drive wheels 50, the braking mechanism 80 is not limited to be provided on the rotating torque transmission mechanism 70, which connects the first motor 10 and the drive wheels 50, but may be provided on three drive wheels 50 or on the first motor 10.

(Revolving Torque Transmission Mechanism)

The revolving torque transmission mechanism 90 has two transmission shafts 97 and 98 rotatably supported in the revolving torque transmission mechanism accommodation unit 32 of the main body case 30, and the first transmission shaft 97 is connected to the rotor shaft 24 of the second motor 20. The first transmission shaft 97 is provided with a first gear 97a, and the second transmission shaft 98 is provided with a second gear 98a. When torque is output from the rotor shaft 24 of the second motor 20 to the first transmission shaft 97, the torque is transmitted from the first gear 97a of the first transmission shaft 97 to the second gear 98a of the second transmission shaft 98 and is transmitted to the third gear 64 integrally attached to the second drive wheel support cases 63 of the hub case 60. Accordingly, the hub case 60 can be rotated and the three drive wheels 50 can be revolved by controlling the second motor 20.

(Balancing Torque Transmission Mechanism)

A balancing torque transmission mechanism 100 is constituted of the revolving torque transmission mechanism 90 and the connection/disconnection means 48. Since the connection/disconnection means 48 is configured to connect the hub case 60 and the main body case 30, the main body case 30 and the hub case 60 can be coupled to each other by fastening the connection/disconnection means 48. Accordingly, in the stumbling state, the main body case 30 and the hub case 60 are in a coupled state, and the rear one of the two grounded drive wheels 50 is permitted to float with the front one of the drive wheels 50 a fulcrum.

With the walking support device 1 of the fourth embodiment, by controlling the first motor 10, the second motor 20, and the connection and disconnection means 48, the travel support control (S1) and the balancing control (S2) can be realized in the same manner as those in the first embodiment.

Fifth Embodiment

The walking support device 1 of the first to fourth embodiments is a self-driving type moving body in which the plurality of drive wheels 50 are rotated by the first motor 10. However, a moving body of the present invention is not limited to a self-driving type moving body, but may be moved in the traveling direction by torque from another driving source or by human power.

Figure 20:
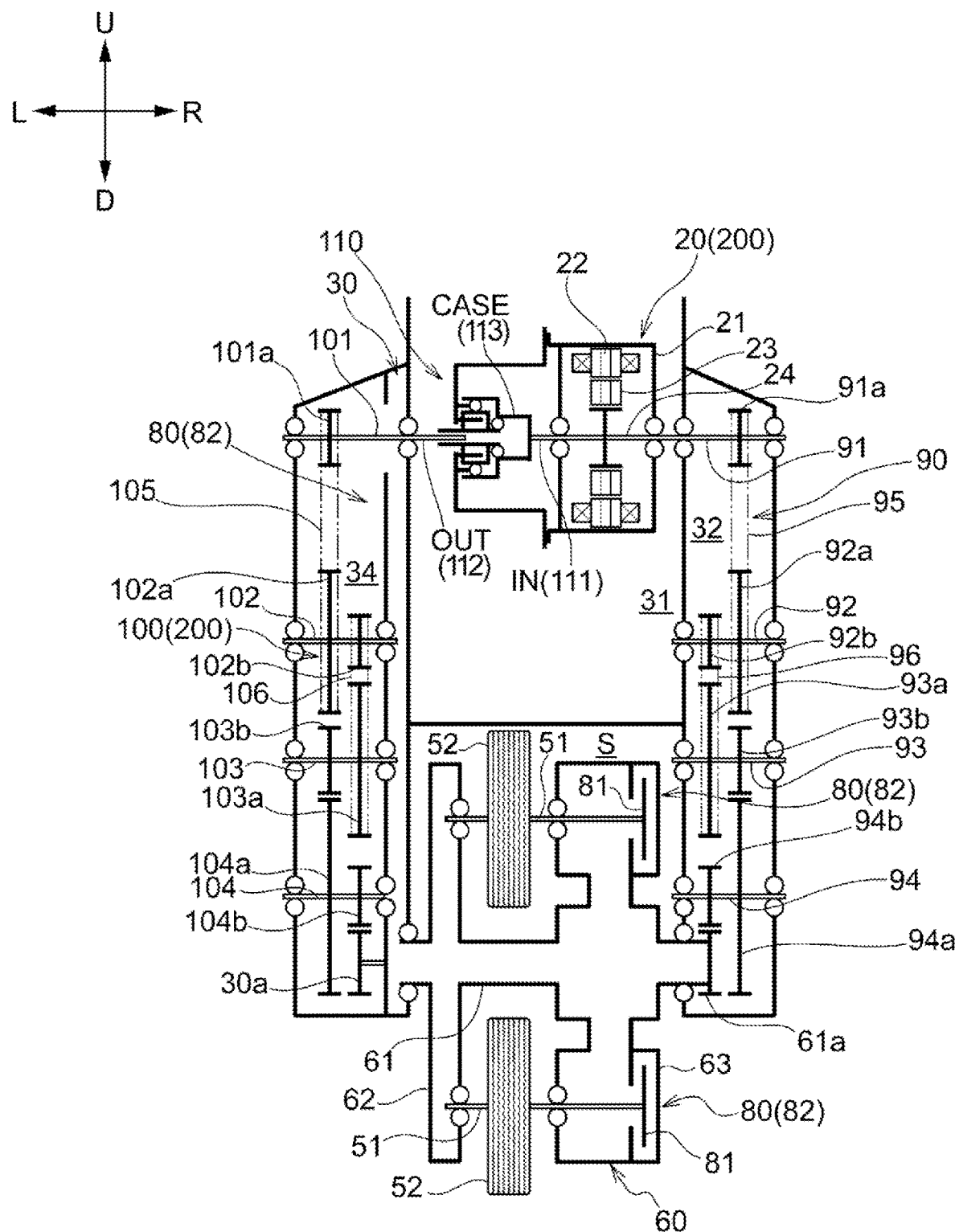
FIG. 20 is a skeleton view illustrating a torque transmission mechanism of a walking support device of a fifth embodiment and arrangement thereof.

As illustrated in FIG. 20, a walking support device 1 of the fifth embodiment includes: a plurality of wheels 52 capable of rotating around a plurality of rotating shafts 51 disposed on a circumference around a common axis C; and the hub case 60 supporting the plurality of rotating shafts 51 to be capable of revolving around the axis C, in which a second motor 20 is connected to the hub case 60 to be capable of transmitting torque so as to revolve the plurality of wheels 52, and further includes: a main body case 30 holding the second motor 20; and a center-of-gravity moving mechanism 200 configured to move the center-of-gravity position of the main body case 30. In the present embodiment, a braking mechanism 80 is provided on at least two of three drive wheels 50. In the walking support device 1 of the fifth embodiment, other configurations are the same as those of the first embodiment except that the first motor 10 and the rotating torque transmission mechanism 70 are not provided. Therefore, in FIG. 20, description of the same configurations is omitted with the same reference numerals assigned thereto.

The present invention is not limited to the above-described embodiment and can be appropriately modified, improved, or the like.

The present specification describes at least the following contents. Although corresponding elements or the like in the above-described embodiment are shown in parentheses, the present invention is not limited thereto.

(A1) A moving body (walking support device 1) including: a plurality of wheels (drive wheels 50) capable of rotating around a plurality of rotating shafts (rotating shafts 51) disposed on a circumference around a common axis (axis C); and a supporting unit (hub case 60) supporting the plurality of rotating shafts to be capable of revolving around the axis, in which a first power source (first motor 10) is connected to the plurality of wheels to be capable of transmitting power so as to rotate the plurality of wheels, and a second power source (second motor 20) is connected to the supporting unit to be capable of transmitting power so as to revolve the plurality of wheels.

According to (A1), by the two power sources, it is possible to revolve the plurality of wheels even in a state where the wheels are not locked.

(A2) The moving body according to (A1), in which a first power transmission mechanism (rotating torque transmission mechanism 70) connecting the first power source and the plurality of wheels is disposed on one side of the plurality of wheels in an axis direction along the axis, and a second power transmission mechanism (revolving torque transmission mechanism 90) connecting the second power source and the supporting unit is disposed on the other side of the plurality of wheels in the axis direction.

According to (A2), by disposing the first torque transmission mechanism connecting the first power source and the plurality of wheels and the second power transmission mechanism connecting the second power source and the supporting unit on both sides across the plurality of wheels, it is possible to dispose the first power transmission mechanism, the second power transmission mechanism, and the plurality of wheels in a balanced manner.

(A3) The moving body described in (A2), in which the first power source is disposed on the other side of the first power transmission mechanism in the axis direction.

According to (A3), by disposing the first power source on a wheel side of the first power transmission mechanism, it is possible to prevent the first power source from sticking out in the axis direction.

(A4) The moving body according to (A2) or (A3), in which the second power source is disposed on the other side of the second power transmission mechanism in the axis direction.

According to (A4), by disposing the second power source on a wheel side of the second power transmission mechanism, it is possible to prevent the second power source from sticking out in the axis direction.

(A5) The moving body according to any one of (A1) to (A4), in which the supporting unit includes a holding unit holding a first power transmission mechanism (rotating torque transmission mechanism 70) connecting the first power source and the plurality of wheels, and the holding unit has: a first holding unit (revolving shaft 61) extending in the axis direction along the axis; and a second holding unit (second drive wheel support cases 63) extending in a direction (outer diameter direction) orthogonal to the axis direction.

According to (A5), since the supporting unit supporting the plurality of rotating shafts to be capable of revolving has the holding unit holding the first power transmission mechanism, it is possible to simplify structure around the plurality of wheels.

(A6) The moving body according to any one of (A1) to (A5), further including a braking unit (braking mechanism 80) provided in at least one of the plurality of wheels, the first power source, and a path of a first power transmission mechanism connecting the first power source and the plurality of wheels.

According to (A6), it is possible to stop rotation of the plurality of wheels by the braking unit.

(A7) The moving body according to any one of (A1) to (A6), further including: a first control device (first control device 120a) configured to control the first power source to control rotation of the plurality of wheels; and a second control device (second control device 120b) configured to control the second power source to control revolution of the supporting unit.

According to (A7), it is possible to control rotation and revolution of the plurality of wheels properly by the first control device and the second control device.

(A8) The moving body according to (A7), further including intention acquisition means (intention acquisition means 43) configured to acquire moving intention of a user who uses the moving body.

According to (A8), by being equipped with the intention acquisition means configured to acquire user's moving intention, the moving body can be moved according to user's moving intention.

(A9) The moving body according to (A8), in which, when the intention acquisition means acquires user's intention to start moving forward or to accelerate forward in a traveling direction, the first control device controls rotation so that traction in a forward direction increases on the plurality of wheels.

According to (A9), the moving body can be moved forward according to user's intention to start moving forward or to accelerate forward in the traveling direction.

(A10) The moving body according to (A8) or (A9), in which, when the intention acquisition means acquires user's intention to decelerate forward in the traveling direction or to start moving backward in a direction opposite to the traveling direction, the first control device controls rotation so that traction in the forward direction decreases or traction in a backward direction increases on the plurality of wheels.

According to (A10), the moving body can be decelerated or moved backward according to user's intention to decelerate forward in the traveling direction or to start moving backward in the direction opposite to the traveling direction.

(A11) The moving body according to (A10), in which the first control device is configured to control regeneration when controlling rotation so that traction in the forward direction decreases on the plurality of wheels.

According to (A11) the moving body can generate power by the first power source when decelerating.

(A12) The moving body according to any one of (A7) to (A11), further including slope detection means (slope detection means 45) configured to detect a slope of a surface on which the moving body travels.

According, to (A12), by being equipped with the slope detection means configured to acquire a slope of a surface, it is possible to grasp slope conditions of the surface properly.

(A13) The moving body according to (A12), in which, when the slope detection means detects an uphill of a surface in front in the traveling direction of the moving body, the first control device controls rotation so that traction in the forward direction increases on the plurality of wheels.

According to (A13), even in a case where a surface is upwardly tilted, the moving body can be moved properly.

(A14) The moving body according to (A12) or (A13), in which, when the slope detection means detects a downhill of a surface in front in the traveling direction of the moving body, the first control device controls rotation so that traction in the forward direction decreases on the plurality of wheels.

According to (A14), even in a case where a surface is downwardly tilted, it is possible to move the moving body properly.

(A15) The moving body according to any one of (A7) to (A14), further including step detection means (step detection means 46) configured to detect a step of a surface on which the moving body travels.

According to (A15), by being equipped with the step detection means configured to detect a step of a surface, it is possible to recognize the step of the surface properly.

(A16) The moving body according to (A15), in which, when the step detection means detects a step in front in the traveling direction of the moving body, the second control device controls revolution so as to generate torque for controlling revolution of the supporting unit.

According to (A16), by revolving the plurality of wheels according to a step, the moving body can easily climb over the step.

(A17) The moving body according to any one of (A1) to (A16), further including: a base (main body case 30) holding the first power source and the second power source; and a center-of-gravity moving mechanism (center-of-gravity moving mechanism 200) configured to move the center-of-gravity position of the base.

According to (A17), by being equipped with the center-of-gravity moving mechanism configured to change the center-of-gravity position of the base, balance of the base can be properly maintained.

(A18) The moving body according to (A17), in which the second power source is connected to, in addition to the supporting unit, the base to be capable of transmitting power.

According to (A18), since the second power source is connected to, in addition to the supporting unit, the base to be capable of transmitting power, the second power source serves both as a power source for revolving the plurality of wheels and for moving the center of gravity, thereby the number of power sources being reduced.

(A19) The moving body according to (A18), further including an irreversible rotation transmission body (irreversible rotation transmission body 110) on a path of a third power transmission mechanism (balancing torque transmission mechanism 100) connecting the second power source and the base.

According to (A19), by the two power sources, it is possible to realize forward traveling and balancing control during normal traveling, integral rotation when the moving body is stumbling over a step, and revolution when the moving body is climbing over a step.

(A20) The moving body according to (A18) or (A19), further including: a first control device (first control device 120a) configured to control the first power source to control rotation of the plurality of wheels; and a third control device (third control device 120c) configured to control the second power source to control the center-of-gravity position of the base.

According to (A20), by the first control device and the third control device, it is possible to control rotation of the plurality of wheels and balance of the base properly.

(A21) The moving body according to any one of (A1) to (A20), further including a base (main body case 30) holding the first power source and the second power source, in which the base is provided with a temporary holding unit (hook unit 36) to hold cargo (luggage B) temporally, and, in an upright posture where the base stands up along the vertical direction, the temporary holding unit is positioned in front of a virtual vertical line (virtual vertical line P) passing through the axis.

According to (A21), since the hook unit is positioned in front of the virtual vertical line passing through the axis in the upright posture of the moving body, it is possible to position the center-of-gravity position properly in a state where a load is applied with the cargo hung on the hook unit.

(A22) The moving body according to any one of (A1) to (A21), further including a base (main body case 30) holding the first power source and the second power source, in which the base is provided with an auxiliary unit (stand 37) configured to support a load in an axis direction along the axis of the moving body.

According to (A22), since the base is provided with the auxiliary unit configured to support the load of the moving body, the moving body can stand on its own when not in use.

(A23) The moving body according to (A22), further including: a braking unit (braking mechanism 80) provided in at least one of the plurality of wheels, the first power source, and a path of a first power transmission mechanism (rotating torque transmission mechanism 70) connecting the first power source and the plurality of wheels; and a braking control device (braking control device 120d) configured to control actuation of the braking unit, in which the auxiliary unit is configured to be displaceable to at least a first position (upper position) and a second position (lower position) and, in the second position, to abut against a surface with which the plurality of wheels are in contact, and the braking control device controls the braking unit to be actuated when the auxiliary unit is positioned in the second position.

According to (A23), by recognize the position of the auxiliary unit to control the braking unit according to the position of the auxiliary unit, it is possible to prevent the moving body from moving when the auxiliary unit is in operation.

(A24) The moving body according to any one of (A1) to (A23), further including: a battery (battery 130) configured to supply power to the first power source and the second power source; and a base (main body case 30) holding the first power source, the second power source, and the battery, in which the base is provided with a gripping unit (gripping unit 40), and the battery is disposed between the gripping unit and the first power source and between the gripping unit and the second power source.

According, to (A24), the battery configured to supply power to the first power source and the second power source can be accommodated in the base.

(A25) The moving body according to any one of (A1) to (A24), further including a base (main body case 30) holding the first power source and the second power source, in which one of the first power source and the second power source is disposed to overlap a virtual vertical line (virtual vertical line P) passing through the axis in an upright posture where the base stands up along the vertical direction, and the other one of the first power source and the second power source is disposed to be offset from the virtual vertical line to either side in the traveling direction of the moving body in the upright posture.

According to (A25), by disposing the first power source and the second power source to be staggered in the traveling direction of the moving body, it is possible to suppress the moving body from getting bigger in a shaft direction.

(A26) A moving body (walking support device 1) including: a plurality of wheels (wheels 52) capable of rotating around a plurality of rotating shafts (rotating shafts 51) disposed on a circumference around a common axis (axis C); and a supporting unit (hub case 60) supporting the plurality of rotating shafts to be capable of revolving around the axis, in which a second power source is connected to the supporting unit to be capable of transmitting power so as to revolve the plurality of wheels, and the moving body further includes: a base (main body case 30) holding the second power source; and a center-of-gravity moving mechanism (center-of-gravity moving mechanism 200) configured to move the center-of-gravity position of the base.

According to (A26), by revolving the plurality of wheels and maintaining balance of the base by the second power source and the center-of-gravity moving mechanism, it is possible to move the moving body properly.

(A27) The moving body according to (A26), in which the second power source is connected to, in addition to the supporting unit, the base to be capable of transmitting power.

According to (A27), since the second power source is connected to, in addition to the supporting unit, the base to be capable of transmitting power, the second power source serves both as a power source for revolving the plurality of wheels and for moving the center of gravity, thereby the number of power sources being reduced.

(A28) The moving body according to (A27), further including an irreversible rotation transmission body on a path of a third power transmission mechanism (balancing torque transmission mechanism 100) connecting the second power source and the base.

According to (A28), by one power source, it is possible to realize balancing control during normal traveling, integral rotation when the moving body is stumbling over a step, and revolution when the moving body is climbing over a step.

(A29) The moving body according to in (A27) or (A28), further including: a second control device (second control device 120b) configured to control the second power source to control revolution of the supporting unit; and a third control device (third control device 120c) configured to control the second power source to control the center-of-gravity position of the base.

According to (A29), by the second control device and the third control device, it is possible to control revolution of the plurality of wheels and balance of the base properly.

(A30) The moving body according to any one of (A27) to (A29), in which a third power transmission mechanism (balancing torque transmission mechanism 100) connecting the second power source and the base is disposed on one side of the plurality of wheels in an axis direction along the axis, and a second power transmission mechanism (revolving torque transmission mechanism 90) connecting the second power source and the supporting unit is disposed on the other side of the plurality of wheels in the axis direction.

According to (A30), by disposing the third power transmission mechanism connecting the second power source and the base and the second power transmission mechanism connecting the second power source and the supporting unit on both sides across the plurality of wheels, it is possible to dispose the third power transmission mechanism, the second power transmission mechanism, and the plurality of wheels in a balanced manner.

(A31) The moving body according to (A30), in which the second power source is disposed between the third power transmission mechanism and the second power transmission mechanism in the axis direction.

According to (A31), by disposing the second power source between the third power transmission mechanism and the second power transmission mechanism, it is possible to prevent the second power source from sticking out in the axis direction.

(A32) The moving body according to (A30) or (A31), in which the first power source is connected to the plurality of wheels to be capable of transmitting power so as to rotate the plurality of wheels, the base holds the first power source in addition to the second power source, and the first power source and the second power source are disposed between the third power transmission mechanism and the second power transmission mechanism in the axis direction.

According to (A32), since the first power source is connected to the plurality of wheels to be capable of transmitting power so as to rotate the plurality of wheels, the moving body can be self-driven. By disposing the first power source and the second power source between the third power transmission mechanism and the second power transmission mechanism, it is possible to prevent the first power source and the second power source from sticking out in the axis direction.

(A33) The moving body according to (A32), in which the first power transmission mechanism (rotating torque transmission mechanism 70) connecting the first power source and the plurality of wheels is disposed between the plurality of wheels and the third power transmission mechanism or between the plurality of wheels and the second power transmission mechanism in the axis direction.

According to (A33), since the first power transmission mechanism connecting the first power source and the wheels is disposed between the plurality of wheels and the third power transmission mechanism or between the plurality of wheels and the second power transmission mechanism, it is possible to dispose the first to third power transmission mechanisms and the plurality of wheels in a balanced manner.

(A34) The moving body according to (A32) or (A33), in which the supporting unit includes a holding unit holding the first power transmission mechanism connecting the first power source and the plurality of wheels, and the holding unit includes: a first holding unit (revolving shaft 61) extending in the axis direction along the axis; and a second holding unit (second drive wheel support cases 63) extending in a direction (outer diameter direction) orthogonal to the axis direction.

According to (A34), since the supporting unit supporting the plurality of rotating shafts to be capable of revolving includes the holding unit holding the first power transmission mechanism, it is possible to simplify structure around the plurality of wheels.

(A35) The moving body according to any one of (A32) to (A34), further including: a braking unit (braking mechanism 80) provided in at least one of the plurality of wheels, the first power source, and a path of the first power transmission mechanism connecting the first power source and the plurality of wheels.

According to (A35), by the braking unit, it is possible to stop rotation of the plurality of wheels.

(B1) A moving body (walking support device 1) including: a plurality of wheels (drive wheels 50) capable of rotating around a plurality of rotating shafts (rotating shafts 51) disposed on a circumference around a common axis (axis C); and a supporting unit (hub case 60) supporting the plurality of rotating shafts to be capable of revolving around the axis, in which a power source (first motor 10) is connected to the plurality of wheels to be capable of transmitting power so as to rotate the plurality of wheels, and the moving body further includes a braking unit (braking mechanism 80) provided in at least one of the plurality of wheels, the power source, and a path of a power transmission mechanism (rotating torque transmission mechanism 70) connecting the power source and the plurality of wheels.

According to (B1), since the supporting unit supports the plurality of rotating shafts to be capable of revolving around the axis, it is possible to revolve the plurality of wheels even when the wheels are not locked. Since the braking unit can stop rotation of the plurality of wheels, it is possible to stop the moving body reliably.

(B2) The moving body according to (B1), in which the braking unit is controlled to be electrically actuated, and the moving body further includes: a first control device (first control device 120a) configured to control the power source to control rotation of the plurality of wheels; and a braking control device (braking control device 120d) configured to control actuation of the braking unit.

According to (B2), by the first control device and the braking control device, it is possible to control rotation and braking of the plurality of wheels properly.

(B3) The moving body according to (B2), further including intention acquisition means (intention acquisition means 43) configured to acquire using intention of a user who uses the moving body.

According to (B3), it is possible to accurately grasp user's using intention.

(B4) The moving body according to (B3), in which, when the intention acquisition means does not acquire using intention or acquires non-using intention, the braking control device controls the braking unit to be actuated.

According to (B4), by controlling the braking unit according to user's using or non-using intention, it is possible to move or brake the moving body according to user's intention.

(B5) The moving body according to (B4), further including traveling state acquisition means (traveling state acquisition means 44) configured to acquire a moving state of the moving body, in which, when the traveling state acquisition means detects movement of the moving body, the braking control device controls to prohibit the braking unit from being actuated.

According to (B5), by grasping a moving state of the moving body to control the braking unit according to the moving state of the moving body, it is possible to move or brake the moving body according to the moving state of the moving body.

(B6) The moving body according to any one of (B3) to (B5), in which the intention acquisition means further acquires user's moving intention.

According to (B6), it is possible to grasp user's moving intention accurately.

(B7) The moving body according to (B6), in which, when the intention acquisition means acquires user's intention to decelerate forward or to stop, the braking control device controls the braking unit to be actuated.

According to (B7), it is possible to brake the moving body according to user's intention to decelerate moving forward or to stop.

(B8) The moving body according to (B6) or (B7), in which, when the intention acquisition means acquires user's intention to start moving forward in a traveling direction, the braking control device controls the braking unit not to be actuated.

According to (B8), it is possible to start movement of the moving body according to user's intention to start moving forward.

(B9) The moving body according to any one of (B2) to (B8), further including traveling state acquisition means (traveling state acquisition means 44) configured to acquire a moving state of the moving body, in which, when the traveling state acquisition means detects movement of the moving body, the braking control device controls to prohibit the braking unit from being actuated.

According to (B9), by grasping a moving state of the moving body to control the braking unit according to the moving state of the moving body, it is possible to move or brake the moving body according to the moving state of the moving body.

(B10) The moving body according to any one of (B2) to (B9), in which the moving body further includes an auxiliary unit (stand 37) configured to be displaceable to at least a first position (upper position) and a second position (lower position), and, in the second position, to abut against a surface with which the plurality of wheels are in contact so as to support a load of the moving body.

According to (B10), since the moving body is provided with the auxiliary unit configured to support a load of the moving body, it is possible to prevent the moving body from tipping when the moving body is not in use.

(B11) The moving body according to (B10), in which the auxiliary unit is configured to support a load in the axis direction (left-right direction) along the axis of the moving body.

According to (B11), by the auxiliary unit, it is possible to prevent the moving body from tipping in the axis direction.

(B12) The moving body according to (B11), in which the auxiliary unit includes: a first auxiliary unit (left stand 37L) provided on one side (left side) of the plurality of wheels in the axis direction so that a lower end side protrudes to this side at the second position; and a second auxiliary unit (right stand 37R) provided on the other side (right side) of the plurality of wheels in the axis direction so that the lower end side protrudes to this side at the second position.

According to (B12), it is possible to prevent the moving body from tipping to one side in the axis direction by the first auxiliary unit and from tipping to the other side in the axis direction by the second auxiliary unit.

(B13) The moving body according to any one of (B10) to (B12), further including an auxiliary unit position acquisition means (stand position acquisition means 47) configured to acquire a position of the auxiliary unit, in which, when the auxiliary unit position acquisition means determines that the support unit is positioned in the second position, the braking control device controls the braking unit to be actuated.

According, to (B13), by grasping a position of the auxiliary unit to control the braking unit according to the position of the auxiliary unit, it is possible to prevent the moving body from moving when the auxiliary unit is in an operating state.

(B14) The moving body according to any one of (B10) to (B13), further including an auxiliary unit position acquisition means (stand position acquisition means 47) configured to acquire a position of the auxiliary unit, in which, when the auxiliary unit position acquisition means determines that the auxiliary unit is not positioned in the second position or is positioned in the first position, the braking control device controls the braking unit not to be actuated.

According to (B14), by grasping a position of the auxiliary unit to control the braking unit according to the position of the auxiliary unit, it is possible to prevent the moving body from being restricted to move when the auxiliary unit is in a non-operating state.

REFERENCE SIGNS LIST

1 walking support device
10 first motor (first power source)
20 second motor (second power source)
30 main body case (base)
36 hook unit (temporary holding unit)
40 gripping unit
43 intention acquisition means
45 slope detection means
46 step detection means
50 drive wheel (wheel)
51 rotating shaft
52 wheel
60 hub case (supporting unit)
61 revolving shaft (first holding unit)
63 second drive wheel support case (second holding unit)
70 rotating torque transmission mechanism (first power transmission mechanism)
80 braking mechanism (braking unit)
90 revolving torque transmission mechanism (second power transmission mechanism)
100 balancing torque transmission mechanism (third power transmission mechanism)
110 irreversible rotation transmission body
120a first control device
120b second control device
120c third control device
120d braking control device
130 battery
200 center-of-gravity moving mechanism
C axis
P virtual vertical line

The invention claimed is:

1. A moving body comprising:
a plurality of wheels capable of rotating around a plurality of rotating shafts disposed on a circumference around a common axis; and
a supporting unit supporting the plurality of rotating shafts to be capable of revolving around the axis, wherein
a first power source is connected to the plurality of wheels to be capable of transmitting power so as to rotate the plurality of wheels,
a second power source is connected to the supporting unit to be capable of transmitting power so as to revolve the plurality of wheels,
a first power transmission mechanism connecting the first power source and the plurality of wheels is disposed on one side of the plurality of wheels in an axis direction along the axis, and
a second power transmission mechanism connecting the second power source and the supporting unit is disposed on an other side of the plurality of wheels in the axis direction.

2. The moving body according to claim 1, wherein the first power source is disposed on the other side of the first power transmission mechanism in the axis direction.

3. The moving body according to claim 1, wherein the second power source is disposed on the other side of the second power transmission mechanism in the axis direction.

4. The moving body according to claim 1, wherein,
the supporting unit includes a holding unit holding a first power transmission mechanism connecting the first power source and the plurality of wheels, and
the holding unit has:
   a first holding unit extending in an axis direction along the axis; and
   a second holding unit extending in a direction orthogonal to the axis direction.

5. The moving body according to claim 1, further comprising
a braking unit provided in at least one of the plurality of wheels, the first power source, and a path of a first power transmission mechanism connecting the first power source and the plurality of wheels.

6. The moving body according to claim 1, further comprising:
a first control device configured to control the first power source to control rotation of the plurality of wheels; and
a second control device configured to control the second power source to control revolution of the supporting unit.

7. The moving body according to claim 6, further comprising
intention acquisition means configured to acquire moving intention of a user who uses the moving body.

8. The moving body according to claim 7, wherein,
when the intention acquisition means acquires user's intention to start moving forward or to accelerate forward in a traveling direction, the first control device controls rotation so that traction in a forward direction increases on the plurality of wheels.

9. The moving body according to claim 7, wherein,
when the intention acquisition means acquires user's intention to decelerate forward in a traveling direction or to start moving backward in a direction opposite to the traveling direction, the first control device controls rotation so that traction in a forward direction decreases or traction in a backward direction increases on the plurality of wheels.

10. The moving body according to claim 9, wherein
the first control device is configured to control regeneration when controlling rotation so that traction in the forward direction decreases on the plurality of wheels.

11. The moving body according to claim 6, further comprising
slope detection means configured to detect a slope of a surface on which the moving body travels.

12. The moving body according to claim 11, wherein,
when the slope detection means detects an uphill of a front surface in front in a traveling direction of the moving body, the first control device controls rotation so that traction in a forward direction increases on the plurality of wheels.

13. The moving body according to claim 11, wherein,
when the slope detection means detects downhill of a front surface in front in a traveling direction of the moving body, the first control device controls rotation so that traction in a forward direction decreases on the plurality of wheels.

14. The moving body according to claim 6, further comprising
step detection means configured to acquire a step of a surface on which the moving body travels.

15. The moving body according to claim 14, wherein,
when the step detection means detects a step in front in a traveling direction of the moving body, the second control device controls revolution so as to generate torque for controlling revolution of the supporting unit.

16. The moving body according to claim 1, further comprising:
a base holding the first power source and the second power source; and
a center-of-gravity moving mechanism configured to move a center-of-gravity position of the base.

17. The moving body according to claim 16, wherein
the second power source is connected to, in addition to the supporting unit, the base to be capable of transmitting power.

18. The moving body according to claim 17, further comprising
an irreversible rotation transmission body on a path of a power transmission mechanism connecting the second power source and the base.

19. The moving body according to claim 17, further comprising:
a first control device configured to control the first power source to control rotation of the plurality of wheels; and
a second control device configured to control the second power source to control the center-of-gravity position of the base.

20. The moving body according to claim 1, further comprising
a base holding the first power source and the second power source, wherein
the base is provided with a temporary holding unit to hold cargo temporally, and,
in an upright posture where the base stands up along a vertical direction, the temporary holding unit is positioned in front of a virtual vertical line passing through the axis.

21. The moving body according to claim 1, further comprising
a base holding the first power source and the second power source, wherein
the base is provided with an auxiliary unit configured to support a load in an axis direction along the axis of the moving body.

22. The moving body according to claim 21, further comprising:
a braking unit provided in at least one of the plurality of wheels, the first power source, and a path of a first power transmission mechanism connecting the first power source and the plurality of wheels, and is electrically controlled to be actuated; and
a braking control device configured to control actuation of the braking unit, wherein
the auxiliary unit is configured to be displaceable to at least a first position and a second position and, in the second position, to abut against a surface with which the plurality of wheels are in contact, and
the braking control device controls the braking unit to be actuated when the auxiliary unit is positioned in the second position.

23. The moving body according to claim 1, further comprising:
a battery configured to supply power to the first power source and the second power source; and
a base holding the first power source, the second power source, and the battery, wherein
the base is provided with a gripping unit, and
the battery is disposed between the gripping unit and the first power source and between the gripping unit and second power source.

24. The moving body according to claim 1, further comprising
a base holding the first power source and the second power source, wherein
one of the first power source and the second power source is disposed to overlap a virtual vertical line passing through the axis in an upright posture where the base stands up along a vertical direction, and
an other one of the first power source and the second power source is disposed to be offset from the vertical line to either side in a traveling direction of the moving body in the upright posture.

25. A moving body comprising:
a plurality of wheels capable of rotating around a plurality of rotating shafts disposed on a circumference around a common axis; and
a supporting unit supporting the plurality of rotating shafts to be capable of revolving around the axis, wherein
a first power source is connected to the supporting unit to be capable of transmitting power so as to revolve the plurality of wheels,
the moving body further comprises:
a base holding the first power source; and
a center-of-gravity moving mechanism configured to move a center-of-gravity position of the base,
the first power source is connected to, in addition to the supporting unit, the base to be capable of transmitting power, and
the moving body further comprises an irreversible rotation transmission body on a path of a first power transmission mechanism connecting the first power source and the base.

26. The moving body according to claim 25, further comprising:
a second control device configured to control the first power source to control revolution of the supporting unit; and
a third control device configured to control the first power source to control the center-of-gravity position of the base.

27. A moving body comprising:
a plurality of wheels capable of rotating around a plurality of rotating shafts disposed on a circumference around a common axis; and
a supporting unit supporting the plurality of rotating shafts to be capable of revolving around the axis, wherein
a first power source is connected to the supporting unit to be capable of transmitting power so as to revolve the plurality of wheels,
the moving body further comprises:
a base holding the first power source; and
a center-of-gravity moving mechanism configured to move a center-of-gravity position of the base,
the first power source is connected to, in addition to the supporting unit, the base to be capable of transmitting power,
a first power transmission mechanism connecting the first power source and the base is disposed on one side of the plurality of wheels in an axis direction along the axis, and
a second power transmission mechanism connecting the first power source and the supporting unit is disposed on an other side of the plurality of wheels in the axis direction.

28. The moving body according to claim 27, wherein
the first power source is disposed between the first power transmission mechanism and the second power transmission mechanism in the axis direction.

29. The moving body according to claim 27, wherein
a second power source is connected to the plurality of wheels to be capable of transmitting power so as to rotate the plurality of wheels,
the base holds the second power source in addition to the first power source, and
the first power source and the second power source are disposed between the first power transmission mechanism and the second power transmission mechanism in the axis direction.

30. The moving body according to claim 29, wherein
a third power transmission mechanism connecting the second power source and the plurality of wheels is disposed between the plurality of wheels and the first power transmission mechanism or between the plurality of wheels and the second power transmission mechanism in the axis direction.

31. The moving body according to claim 29, wherein
the supporting unit includes a holding unit holding a third power transmission mechanism connecting the second power source and the plurality of wheels, and
the holding unit includes:
a first holding unit extending in the axis direction along the axis; and
a second holding unit extending in a direction orthogonal to the axis direction.

32. The moving body according to claim 29, further comprising
a braking unit provided in at least one of the plurality of wheels, the second power source, and a path of a third power transmission mechanism connecting the second power source and the plurality of wheels.

* * * * *